US008883059B2

(12) United States Patent
Lewis et al.

(10) Patent No.: US 8,883,059 B2
(45) Date of Patent: Nov. 11, 2014

(54) METHOD OF MANUFACTURING A FASTENER CLIP WITH SEAL

(75) Inventors: Jeffrey C. Lewis, Addison Township, MI (US); Roger E. Pilon, Avoca, MI (US); Steven M. Benedetti, Sterling Heights, MI (US); Charles K. Fischer, Grant Township, MI (US)

(73) Assignee: Newfrey LLC, Newark, DE (US)

( * ) Notice: Subject to any disclaimer, the term of this patent is extended or adjusted under 35 U.S.C. 154(b) by 643 days.

(21) Appl. No.: 13/190,019

(22) Filed: Jul. 25, 2011

(65) Prior Publication Data

US 2011/0278760 A1 Nov. 17, 2011

Related U.S. Application Data

(62) Division of application No. 11/839,008, filed on Aug. 15, 2007, now abandoned.

(60) Provisional application No. 60/841,640, filed on Aug. 31, 2006, provisional application No. 60/919,675, filed on Mar. 23, 2007.

(51) Int. Cl.
*B29C 45/16* (2006.01)

(52) U.S. Cl.
USPC .......................... 264/255; 264/250; 264/275

(58) Field of Classification Search
None
See application file for complete search history.

(56) References Cited

U.S. PATENT DOCUMENTS

| 2,200,702 | A | 5/1940 | Oddie |
| 2,343,235 | A | 2/1944 | Bashark |
| 2,365,422 | A | 12/1944 | Ludwell |
| 3,029,486 | A | 8/1958 | Raymond |
| 3,093,874 | A | 6/1963 | Rapata |
| 3,106,413 | A | 10/1963 | Hamlin et al. |
| 3,127,965 | A | 4/1964 | Weisenberger, Sr. |
| 3,131,742 | A | 5/1964 | Munse |
| 3,149,850 | A | 9/1964 | Fischer |
| 3,184,769 | A | 5/1965 | Barwood |
| 3,262,722 | A | 7/1966 | Gastineau et al. |
| 3,272,952 | A | 9/1966 | McKeon |
| 3,286,577 | A | 11/1966 | Weidner, Jr. |
| 3,355,205 | A | 11/1967 | Wagner et al. |
| 3,549,477 | A * | 12/1970 | Burgman ................... 428/335 |
| RE27,085 | E | 3/1971 | Weidner, Jr. |

(Continued)

FOREIGN PATENT DOCUMENTS

| DE | 2 250 729 | 3/1974 |
| DE | 195 19 623 | 5/1996 |

(Continued)

OTHER PUBLICATIONS

Drawing No. W703613—Ford Clip, Pnl Trim PSH IN (believed to have been offered for sale prior to Mar. 2006).

(Continued)

*Primary Examiner* — Edmund H. Lee
(74) *Attorney, Agent, or Firm* — Harness, Dickey & Pierce, P.L.C.

(57) ABSTRACT

A single-piece fastener includes a relatively hard clip and a relatively soft seal. The seal can be overmolded onto the clip. A thermal bond is formed between the seal and the clip to inhibit removal of the seal from the clip. The flexible nature of the umbrella of the clip and the seal can accommodate sealing openings in panels of varying thicknesses.

20 Claims, 27 Drawing Sheets

(56) References Cited

U.S. PATENT DOCUMENTS

| | | | |
|---|---|---|---|
| 3,622,167 A | 11/1971 | Velthoven | |
| 3,627,334 A | 12/1971 | Reddy | |
| 3,649,059 A | 3/1972 | Davidson | |
| 3,651,545 A | 3/1972 | Hara | |
| 3,655,424 A | 4/1972 | Orowan | |
| 3,661,046 A | 5/1972 | Waud et al. | |
| 3,905,270 A | 9/1975 | Hehl | |
| 3,910,588 A | 10/1975 | Austin | |
| 4,122,583 A | 10/1978 | Grittner et al. | |
| 4,183,699 A | 1/1980 | Donan, Jr. et al. | |
| 4,235,147 A | 11/1980 | Weidner, Jr. | |
| 4,245,652 A | 1/1981 | Kelly et al. | |
| 4,280,390 A | 7/1981 | Murray | |
| 4,292,007 A | 9/1981 | Wagner | |
| 4,292,876 A | 10/1981 | De Graan | |
| 4,306,708 A | 12/1981 | Gassaway et al. | |
| 4,354,298 A | 10/1982 | Tanaka et al. | |
| 4,364,427 A | 12/1982 | Lefrancois | |
| D268,006 S | 2/1983 | Wollar | |
| 4,393,551 A | 7/1983 | Wollar et al. | |
| 4,422,276 A | 12/1983 | Paravano | |
| 4,427,328 A | 1/1984 | Kojima | |
| 4,431,355 A | 2/1984 | Junemann et al. | |
| 4,460,300 A | 7/1984 | Bettini et al. | |
| 4,472,918 A | 9/1984 | Mach | |
| 4,489,465 A | 12/1984 | Lemkin | |
| 4,505,611 A | 3/1985 | Nagashima et al. | |
| 4,521,147 A | 6/1985 | King, Jr. et al. | |
| 4,631,887 A | 12/1986 | Francovitch | |
| 4,663,910 A | 5/1987 | Hasan | |
| 4,664,574 A | 5/1987 | Kasai | |
| 4,686,808 A | 8/1987 | Triplett | |
| 4,702,657 A | 10/1987 | Jelinek | |
| 4,712,802 A | 12/1987 | Hewison et al. | |
| 4,715,095 A | 12/1987 | Takahashi | |
| 4,744,187 A | 5/1988 | Tripp | |
| 4,749,321 A | 6/1988 | Knohl et al. | |
| 4,753,560 A | 6/1988 | Ryder | |
| 4,778,320 A | 10/1988 | Nakama et al. | |
| 4,780,039 A | 10/1988 | Hartman | |
| 4,781,488 A | 11/1988 | Hayashi | |
| 4,802,388 A | 2/1989 | Roberts | |
| 4,810,147 A | 3/1989 | Hirohata et al. | |
| 4,821,381 A | 4/1989 | Kaneko et al. | |
| 4,855,807 A * | 8/1989 | Yamaji et al. | 257/670 |
| 4,861,208 A | 8/1989 | Boundy | |
| 4,875,818 A | 10/1989 | Reinwall | |
| 4,887,951 A | 12/1989 | Hashimoto | |
| 4,934,856 A | 6/1990 | Pauc | |
| 4,934,887 A | 6/1990 | Sharp et al. | |
| 4,938,645 A | 7/1990 | Wollar | |
| 4,987,656 A | 1/1991 | Sato | |
| 5,011,162 A | 4/1991 | Jelinek | |
| 5,011,356 A | 4/1991 | Fernandez et al. | |
| 5,020,951 A | 6/1991 | Smith | |
| 5,035,560 A | 7/1991 | Watanabe et al. | |
| 5,039,267 A | 8/1991 | Wollar | |
| 5,046,223 A | 9/1991 | Kraus et al. | |
| 5,106,223 A | 4/1992 | Kraus et al. | |
| 5,152,582 A | 10/1992 | Magnuson | |
| 5,165,509 A | 11/1992 | Kanno et al. | |
| 5,165,833 A | 11/1992 | Watanabe et al. | |
| 5,165,834 A | 11/1992 | Takenouchi et al. | |
| 5,173,026 A * | 12/1992 | Cordola et al. | 411/508 |
| 5,178,501 A | 1/1993 | Carstairs | |
| 5,191,513 A | 3/1993 | Sugiura et al. | |
| 5,201,625 A | 4/1993 | Takenouchi et al. | |
| 5,217,337 A | 6/1993 | Junemann et al. | |
| 5,301,396 A | 4/1994 | Benoit | |
| 5,316,423 A | 5/1994 | Kin et al. | |
| 5,319,839 A | 6/1994 | Shimajiri et al. | |
| 5,322,402 A | 6/1994 | Inoue et al. | |
| D354,219 S | 1/1995 | Shimajiri | |
| D355,113 S | 2/1995 | Shimajiri | |
| 5,393,185 A | 2/1995 | Duffy, Jr. | |
| 5,468,108 A | 11/1995 | Sullivan et al. | |
| 5,507,610 A | 4/1996 | Benedetti et al. | |
| 5,527,502 A * | 6/1996 | Kiuchi et al. | 264/250 |
| 5,551,817 A | 9/1996 | Kanie et al. | |
| 5,573,362 A | 11/1996 | Asami et al. | |
| 5,586,853 A | 12/1996 | Poe | |
| 5,592,719 A | 1/1997 | Eto et al. | |
| 5,647,713 A * | 7/1997 | Ge et al. | 411/509 |
| 5,649,798 A | 7/1997 | Ito | |
| 5,651,634 A | 7/1997 | Kraus et al. | |
| 5,689,863 A | 11/1997 | Sinozaki et al. | |
| 5,694,666 A | 12/1997 | Hamamoto et al. | |
| 5,704,753 A | 1/1998 | Ueno et al. | |
| D390,776 S | 2/1998 | Ueno | |
| 5,724,709 A | 3/1998 | Kittmann et al. | |
| 5,725,343 A | 3/1998 | Smith | |
| 5,765,959 A | 6/1998 | Shioda | |
| 5,775,859 A | 7/1998 | Anscher | |
| 5,846,040 A | 12/1998 | Ueno | |
| 5,851,097 A | 12/1998 | Shereyk et al. | |
| 5,857,244 A * | 1/1999 | Edwards et al. | 24/297 |
| 5,865,583 A | 2/1999 | Krawczak et al. | |
| 5,906,463 A | 5/1999 | Damm et al. | |
| 5,975,820 A | 11/1999 | Kirchen | |
| 6,039,523 A | 3/2000 | Kraus et al. | |
| 6,071,446 A * | 6/2000 | O'Brien et al. | 264/46.5 |
| 6,173,969 B1 | 1/2001 | Stoll et al. | |
| 6,209,178 B1 | 4/2001 | Wiese et al. | |
| 6,264,393 B1 | 7/2001 | Kraus | |
| 6,287,043 B1 | 9/2001 | Kraus et al. | |
| 6,305,055 B1 | 10/2001 | Castro | |
| 6,315,510 B1 | 11/2001 | Sturies et al. | |
| 6,336,768 B1 | 1/2002 | Kraus et al. | |
| 6,379,092 B1 | 4/2002 | Patel et al. | |
| D456,699 S | 5/2002 | Nakanishi | |
| 6,435,793 B1 | 8/2002 | Dobson | |
| 6,449,814 B1 | 9/2002 | Dinsmore et al. | |
| 6,572,317 B2 | 6/2003 | Okada et al. | |
| 6,752,950 B2 * | 6/2004 | Clarke | 264/255 |
| 6,916,145 B2 | 7/2005 | Lydan | |
| 6,974,292 B2 | 12/2005 | Hansen | |
| 6,976,292 B2 | 12/2005 | MacPherson et al. | |
| 7,033,121 B2 | 4/2006 | Kirchen | |
| 7,198,315 B2 * | 4/2007 | Cass et al. | 296/29 |
| 7,481,474 B2 | 1/2009 | Higgins et al. | |
| 7,549,830 B2 | 6/2009 | Cooley et al. | |
| 2002/0028123 A1 | 3/2002 | Miura et al. | |
| 2003/0159256 A1* | 8/2003 | Clarke | 24/297 |
| 2004/0052612 A1 | 3/2004 | Miura | |
| 2004/0191025 A1 | 9/2004 | Bauer | |
| 2005/0095084 A1 | 5/2005 | Hansen | |
| 2005/0150087 A1 | 7/2005 | Lydan | |
| 2006/0099051 A1* | 5/2006 | Moerke | 411/508 |
| 2006/0214468 A1* | 9/2006 | Cass et al. | 296/146.16 |

FOREIGN PATENT DOCUMENTS

| | | |
|---|---|---|
| DE | 19930728 | 2/2001 |
| EP | 0890750 | 1/1999 |
| FR | 2 872 556 | 6/2006 |
| GB | 807726 | 1/1959 |
| GB | 1 384 839 | 2/1975 |
| GB | 2 125 878 | 3/1984 |
| GB | 2360322 | 9/2001 |
| JP | H05-94517 A | 12/1993 |
| JP | 10-026115 A | 1/1998 |
| JP | 2004-245355 A | 9/2004 |
| JP | 2005-76648 A2 | 3/2005 |
| WO | WO0229260 | 4/2002 |
| WO | WO 03/093690 | 11/2003 |

OTHER PUBLICATIONS

Four (4) photographs of Emhart Part No. 16803 (offered for sale prior to Mar. 2005).
Five (5) photographs of Emhart Part No. 16872 (offered for sale prior to Mar. 2005).
Four (4) photographs of Emhart Part No. 16363 (offered for sale prior to Mar. 2005).

(56) References Cited

OTHER PUBLICATIONS

Two (2) photographs and one (1) Drawing of TRW Shark Fin Clip, Part No. 60006118A (offered for sale prior to Mar. 2005).
DuPont, "General Design Principles—Module I;" Design Handbook for DuPont Engineering Polymers, published prior to 1992; Title page and pp. 18-23.

Translation of Japanese Patent Office Notification in Japanese Patent Application 2007-258071.

Partial European Search Report for European Patent Application No. EP 07 11 5037, mailed Jul. 31, 2013 (6 pages).

* cited by examiner

METHOD OF MANUFACTURING A FASTENER CLIP WITH SEAL

CROSS-REFERENCE TO RELATED APPLICATIONS

This application is a divisional of U.S. patent application Ser. No. 11/839,008 filed on Aug. 15, 2007, now abandoned, which claimed the benefit of U.S. Provisional Application No. 60/919,675, filed on Mar. 23, 2007 and U.S. Provisional Application No. 60/841,640, filed on Aug. 31, 2006. The disclosures of the above applications are incorporated herein by reference.

FIELD

The present disclosure relates to fastener clips and more particularly to fastener clips with a seal.

BACKGROUND AND SUMMARY

The statements in this section merely provide background information related to the present teachings and may not constitute prior art.

Fastener clips can be used to retain two components together. For example, fastener clips can be used to retain an automotive door or trim panel to an automotive doorframe or support surface. The fastener clips can engage with a doghouse assembly in or on the door panel and can be inserted through an opening in the doorframe to retain the panel on the doorframe. To reduce liquid, debris, and noise from entering into the cabin of the vehicle, a seal can be utilized around the opening in the doorframe. A two-piece clip arrangement is typically utilized wherein a hard clip and a separate relatively soft seal member are used to retain the door panel to the doorframe and provide a seal against the doorframe. The two pieces can be assembled manually or with automation on the assembly line. The use of two pieces, however, requires an extra step for the assembling of the door panel to the doorframe. Additionally, the use of two separate pieces may result in the pieces being separated or lost during the assembly process, requiring rework or resulting in a door panel attached to a doorframe without the desired sealing against the doorframe. Thus, it would be advantageous to provide a single-piece fastener that incorporates both the clip and the seal into a single component.

The doorframe can be made of sheet metal or other materials and various portions of the doorframe may have varying thicknesses. The differing thicknesses of the doorframe can require the use of different clips on the same doorframe to provide a desired sealing function against the doorframe along with desired retention. The use of differing clips on the same doorframe requires the stocking and supplying of at least two separate and distinct fasteners. Additionally, the use of differing fasteners may result in the wrong fastener being inadvertently inserted into a portion of the doorframe for which it is not designed. Thus, it would be advantageous if a single fastener could be utilized that can accommodate the differing thicknesses of the doorframe while providing the desired sealing and retention functions.

A fastener according to the present teachings includes a clip of a first material having a first portion configured to be secured to a panel and a second portion configured to be inserted into an opening in a frame and be retained therein. The clip includes a radially outwardly extending umbrella disposed between the first and second portions. The umbrella has opposite first and second surfaces with a sidewall extending therebetween. The fastener includes a sealing member of a second material different from the first material. The sealing member is attached to at least one of the first surface, the second surface and the sidewall of the umbrella. The sealing member includes at least one axially extending rib that is operable to form a seal around an opening in a frame to which the fastener is inserted. The flexibility of the umbrella and the sealing member can compensate for varying thickness of the frame. The sealing member can be attached to the umbrella by thermal bonding in an overmolding process. Thermal bonding of the sealing member to the clip forms a convenient single-piece fastener that can be used to secure an automotive door panel to an automotive doorframe and form a seal around the opening in the doorframe.

A fastener according to the present teachings can include post that extends axially between a pair of resilient legs. The post can include a pair of radially outwardly extending projections that are aligned with the legs. The projections can limit the radially inward deformation of the legs when the fastener is being inserted into an opening.

Further areas of applicability will become apparent from the description provided herein. It should be understood that the description and specific examples are intended for purposes of illustration only and are not intended to limit the scope of the claims.

DRAWINGS

The drawings described herein are for illustration purposes only and are not intended to limit the scope of the present teachings and claims in any way.

Figure 45:
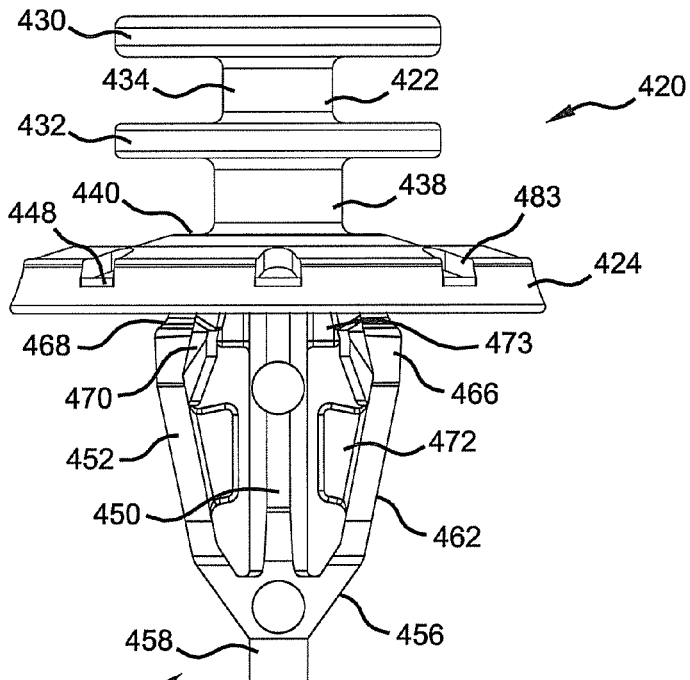
FIG. 45 is a front elevation view of another preferred fastener according to the present teachings.
Figure 46:
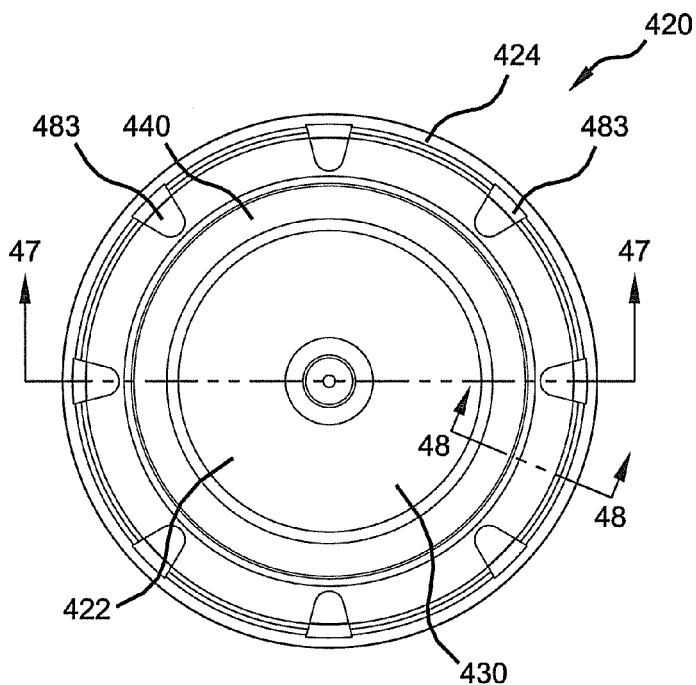
FIG. 46 is a top plan view of the fastener of FIG. 45.
Figure 47:
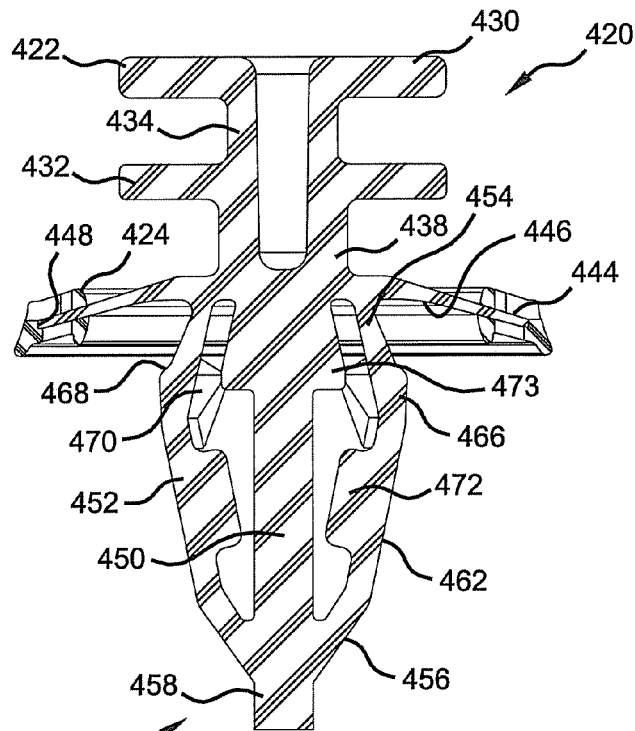
Figure 48:
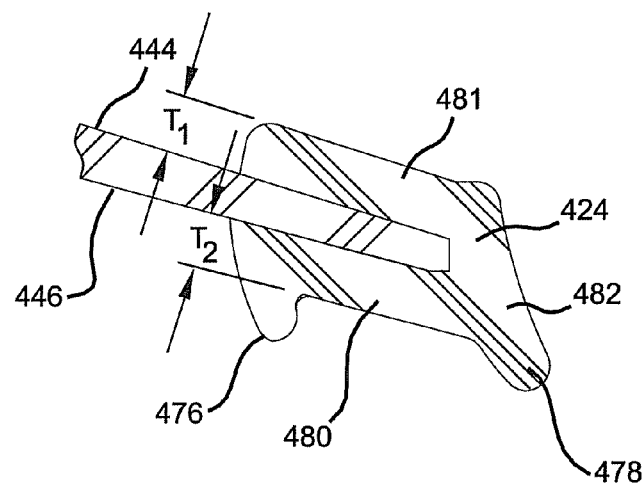
Figure 49:
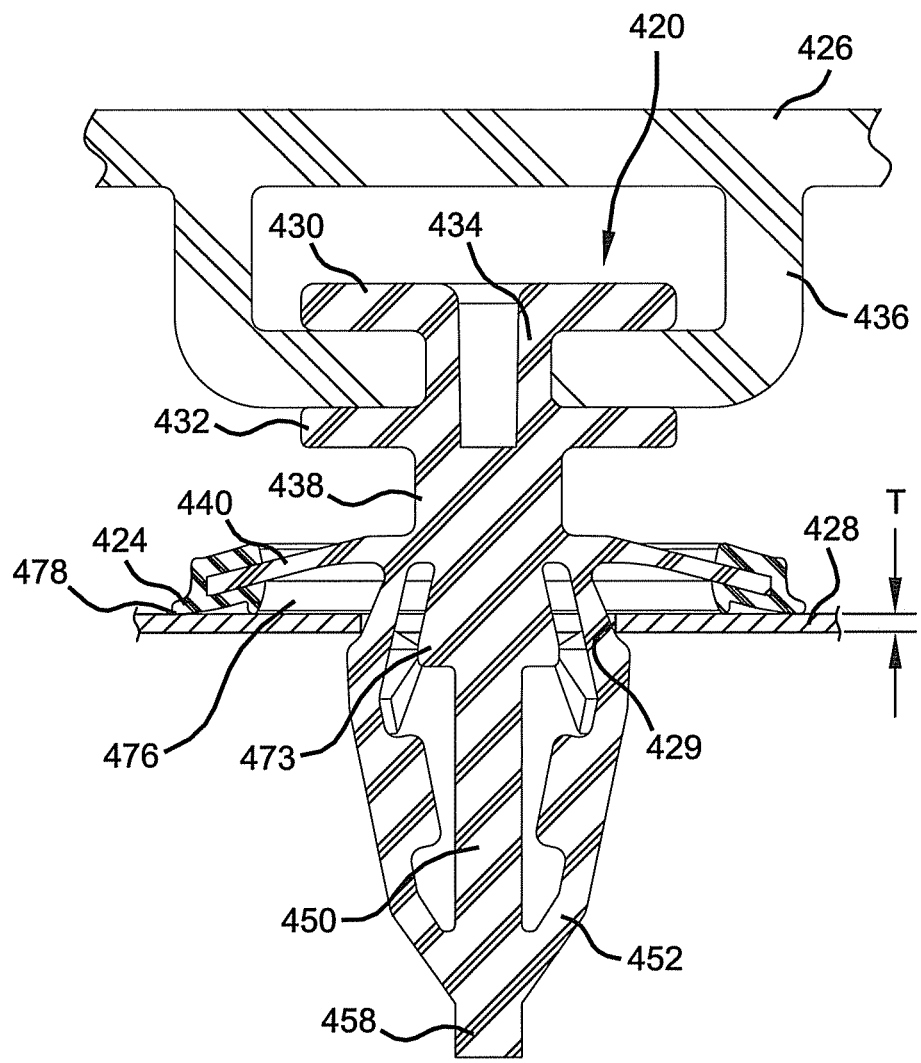
Figure 50:
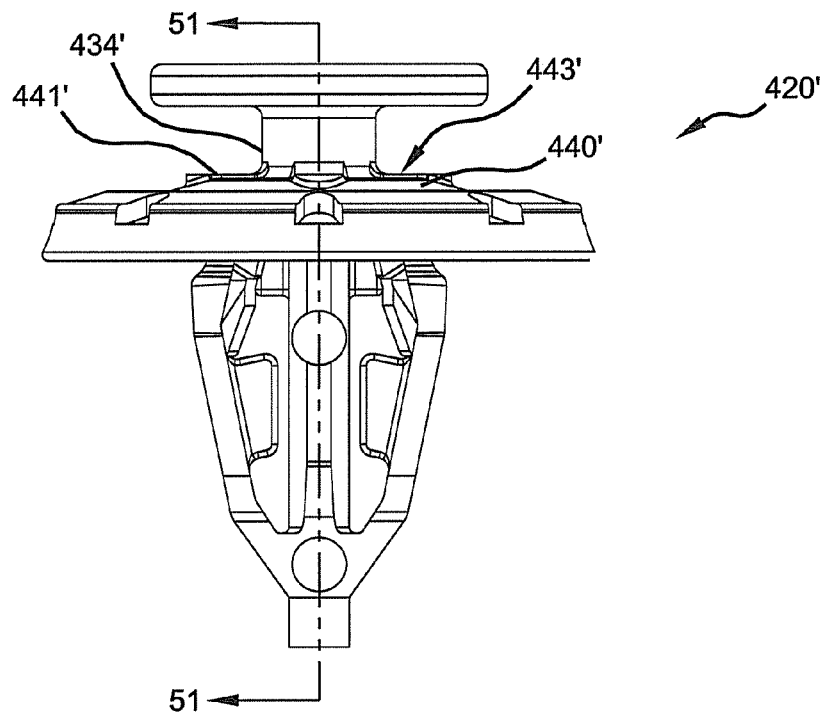
Figure 51:
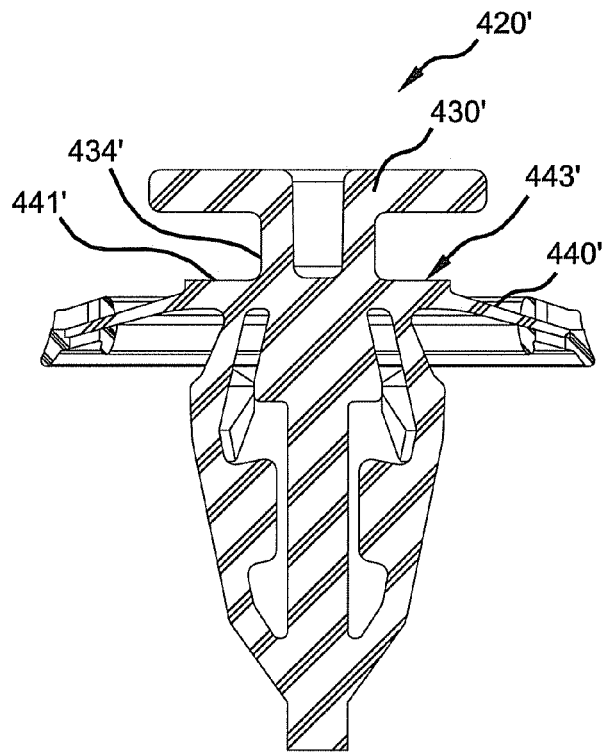

FIGS. 47 and 48 are cross-sectional views of the fastener along lines 47-47 and 48-48, respectively of FIG. 46;

FIG. 49 is a cross-sectional view of the fastener of FIG. 45 engaged with a doghouse of a door panel and a doorframe;

FIG. 50 is a front plan view of another preferred fastener according to the present teachings; and FIG. 51 is a cross-sectional view along line 51-51 of FIG. 50.

DETAILED DESCRIPTION

The following description is merely exemplary in nature and is not intended to limit the present teachings, application, or uses. It should be understood that throughout the drawings, corresponding reference numerals (e.g., 20, 20', 20", etc. and 20, 120, 220, etc.) indicate like or corresponding parts and features.

Figure 1:
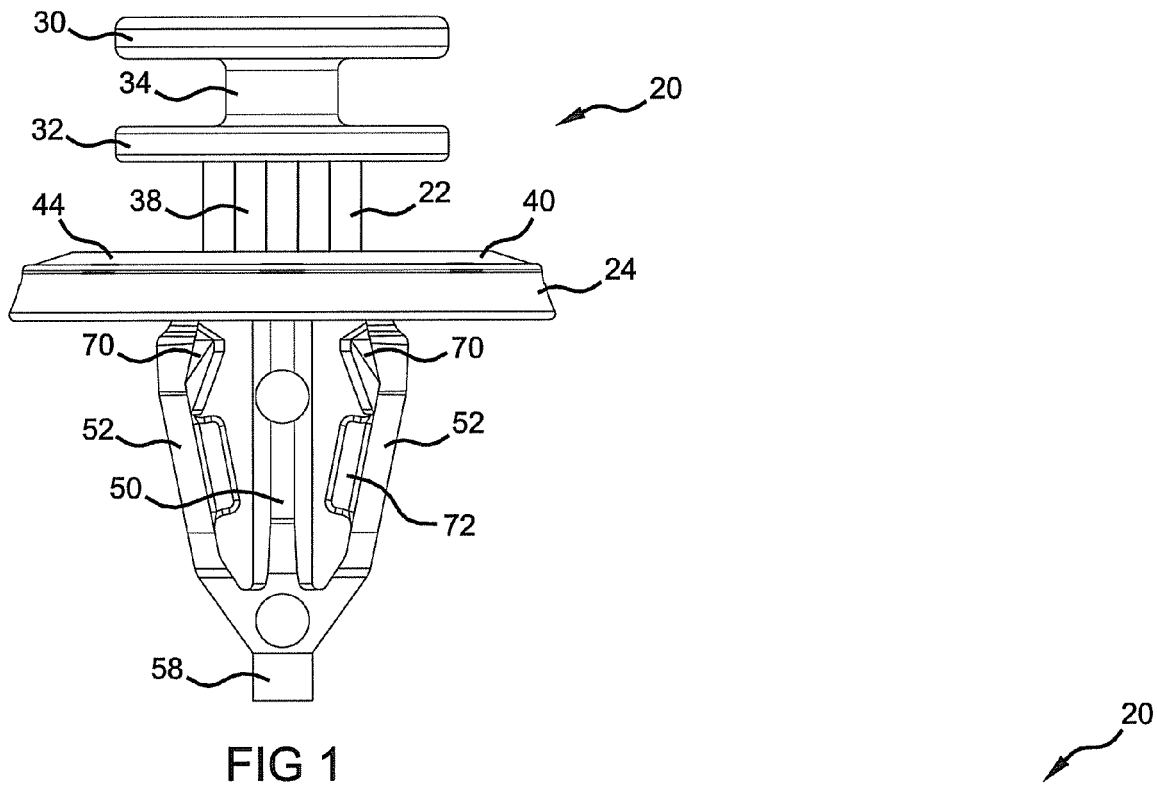
FIG. 1 is a front elevation view of an alternate fastener according to the present teachings.
Figure 2:
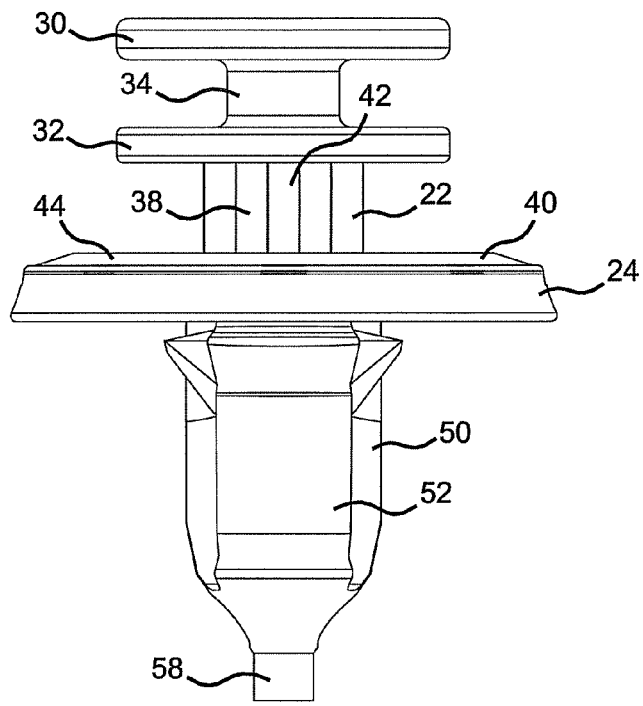
FIG. 2 is a side elevation view of the fastener of FIG. 1.
Figure 3:
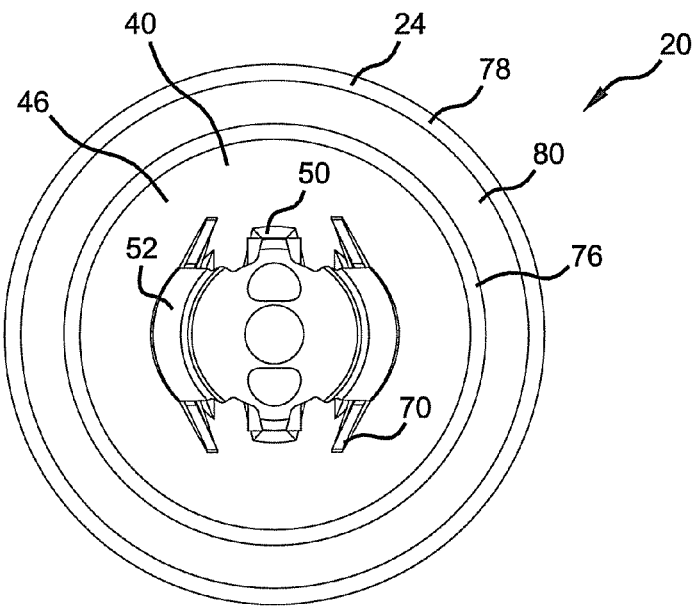
FIGS. 3 and 4 are respective bottom and top plan views of the fastener of FIG. 1.
Figure 4:
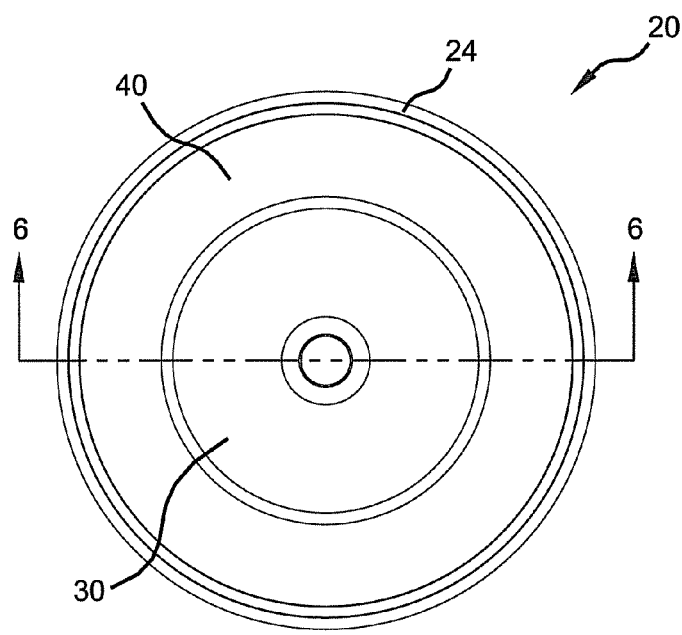
Figure 5:
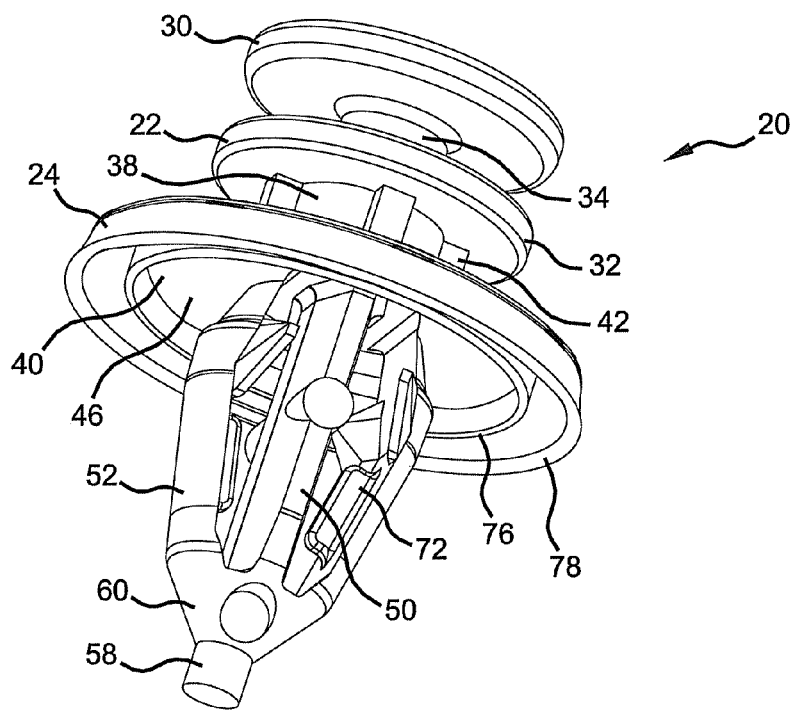
FIG. 5 is a perspective view of the fastener of FIG. 1.
Figure 6:
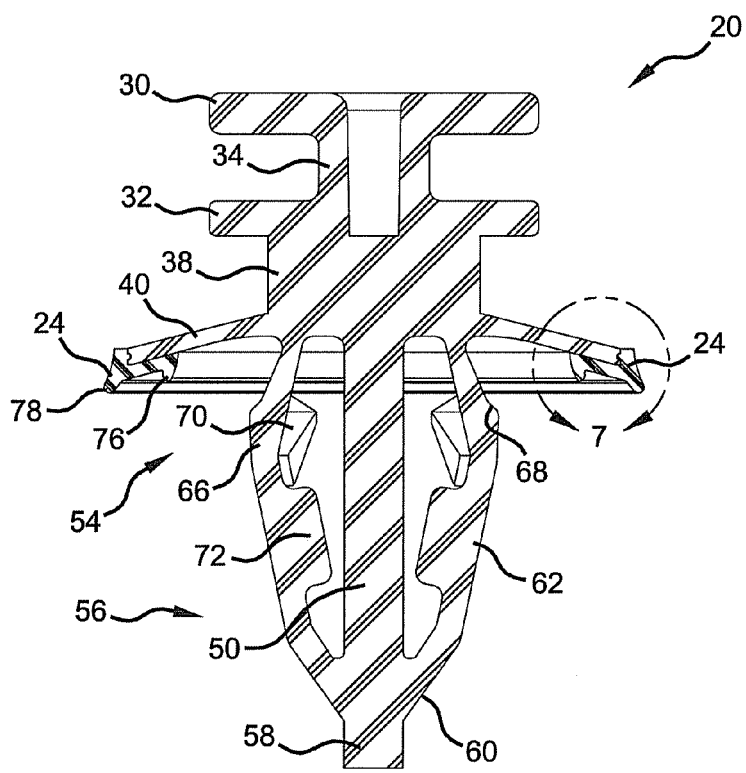
FIG. 6 is a cross-sectional view of the fastener along line 6-6 of FIG. 4.
Figure 7:
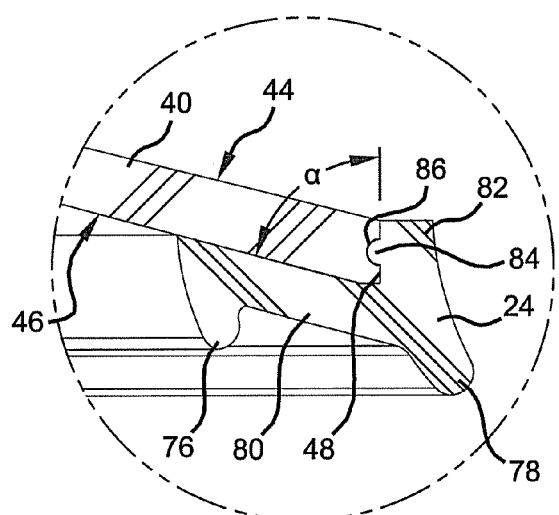
FIG. 7 is an enlarged fragmented view of a portion of the umbrella and seal within circle 7 of FIG. 6.
Figure 8:
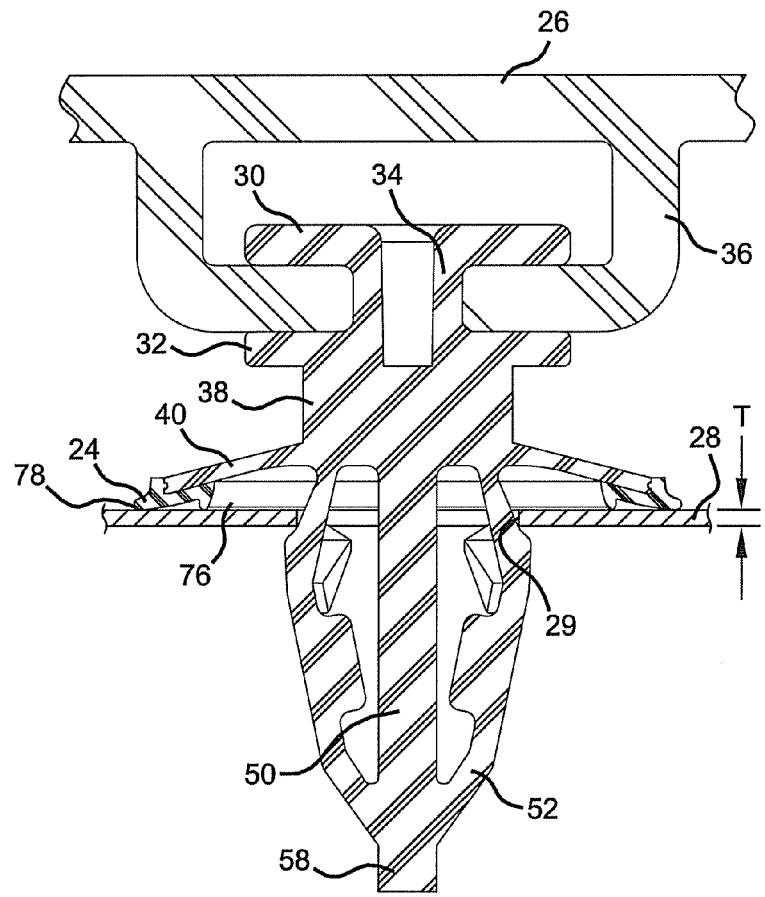
FIG. 8 is a cross-sectional view of the fastener of FIG. 1 engaged with a doghouse of a door panel and a doorframe.

Referring to FIGS. 1-8, a single-piece fastener 20 according to the present teachings is shown. Fastener 20 includes a clip 22 and a seal 24 attached thereto. Clip 22 is a relatively hard and rigid piece while seal 24 is a relatively soft and flexible piece. Fastener 20 is operable to retain a panel, such as a door panel 26, to a frame or support member, such as doorframe 28, as shown in FIG. 8. Seal 24 is operable to seal against doorframe 28 to inhibit moisture, liquids, debris, and noise from entering into the interior of the automotive vehicle through doorframe 28.

Clip 22 includes a generally-circular head 30 and a generally-circular collar 32 with a cylindrical neck 34 therebetween. Head 30 and neck 34 are configured to fit within a doghouse assembly 36 coupled to door panel 26. Doghouse assembly 36 can be mounted to door panel 26, co-molded with door panel 26 or otherwise secured to door panel 26. Head 30 and collar 32 limit axial movement of fastener 20 relative to doghouse assembly 36 and door panel 26.

Clip 22 includes a lower neck 38 below collar 32 that extends to an umbrella or flange 40. A plurality of gussets 42 can be spaced around the periphery of neck 38, if desired, to provide additional rigidity and support for clip 22 and for umbrella 40. Umbrella 40 extends radially outwardly and axially downwardly from neck 38. Umbrella 40 includes an upper surface 44, a lower surface 46, and a peripheral sidewall 48 extending therebetween. Umbrella 40 can be circular. Below umbrella 40, clip 22 includes a central post 50 and a pair of legs 52 that are spaced 180 degrees from one another and are spaced apart from post 50. Upper portions 54 of legs 52 are connected to umbrella 40 adjacent post 50 while lower portions 56 are connected to post 50 adjacent a tip 58 of clip 22.

The merging of legs 52 with post 50 adjacent tip 58 forms a tapering lead-in 60 that facilitates guiding of the lower portion of clip 22 into an opening 29 in doorframe 28. A first intermediate portion 62 of legs 52 tapers radially outwardly as legs 52 extend axially upwardly toward a second intermediate portion 66. Second intermediate portion 66 continues to taper radially outwardly as it extends axially upwardly, but at a lesser rate than first intermediate portion 62. Legs 52 include a shoulder 68 at the end of second intermediate portion 66. Legs 52 taper radially inwardly as they extend axially from shoulder 68 toward umbrella 40.

Legs 52 can each include a pair of wings 70 that extend therefrom. Wings 70 in conjunction with shoulders 68 interact with the opening 29 in doorframe 28 to retain clip 22 therein. Each leg 52 can include a rib 72 that extends radially inwardly from the inner surface thereof. Ribs 72 can be compressed against post 50 when attempting to withdraw fastener 20 from doorframe 28. Ribs 72 can limit the radially inward movement of each leg 52 such that both legs 52 must be moved radially inwardly to remove fastener 20 from doorframe 28. Ribs 72 can enhance the retention of fastener 20 within doorframe 28.

Seal 24 is generally annular and includes inner and outer axially extending ribs 76, 78 with a connecting portion 80 extending radially therebetween. Inner rib 76 extends axially from lower surface 46 of umbrella 40 a distance less than that of outer rib 78. Connecting portion 80 and the top side of inner rib 76 extend along lower surface 46 of umbrella 40. Outer rib 78 includes an upper portion 82 that extends upwardly along peripheral sidewall 48 of umbrella 40. Seal 24 is thermally bonded to lower surface 46 and peripheral sidewall 48 of umbrella 40, as described below. Upper portion 82 of outer rib 78 can include a radially inwardly extending projection 84 that can be engaged with a complementary radially inwardly extending recess 86 in peripheral sidewall 48. The engagement of projection 84 within recess 86 serves to form a mechanical lock or bond between seal 24 and umbrella 40 that enhances the retaining of seal 24 on umbrella 40. Additionally, an angle $\alpha$ between the lower surface 46 and peripheral sidewall 48 of umbrella 40 can be made less than 90 degrees to form an additional mechanical lock or bond between seal 24 and umbrella 40, as shown in FIG. 7.

Clip 22 is a relatively hard material while seal 24 is a relatively soft and resilient material. For example, clip 22 can be made from a first material having a first durometer rating while seal 24 is made from a second material different from the first material and having a second durometer rating less than the first durometer rating. Clip 22 and seal 24 can be molded in a two-step or two-shot process. Clip 22, the hard part, can be injection molded first in a mold cavity. Clip 22 can be a thermo-plastic material, such as by way of non-limiting example, acetyl. Once clip 22 is injection molded, seal 24 can be injection molded (overmolded) around umbrella 40 of clip 22. The overmolding of seal 24 onto umbrella 40 can be done while clip 22 is still hot or warm such that thermal bonding occurs between umbrella 40 and seal 24. The thermal bonding can inhibit the removal of seal 24 from umbrella 40. It is believed that the thermal bonding that occurs is adequate to meet removal force requirements for typical applications. The removal force can be enhanced through the use of the mechanical locking features described above and below. Thus, a fastener 20 according to the present teachings can include an injection molded clip 22 that is relatively hard having a relatively soft seal 24 overmolded over a portion of clip 22.

In use, clip 22 is inserted into doghouse assembly 36 which can be integral with or attached to a door panel 26. Neck 34 extends through the opening in doghouse assembly 36 with head 30 and collar 32 disposed on opposite sides of doghouse assembly 36. With fastener 20 secured in doghouse assembly 36, the base portion of fastener 20 can be inserted into an opening 29 in a doorframe 28. During insertion of fastener 20 into doorframe 28, intermediate portions 62, 66 will engage with opening 29 and legs 52 will be elastically compressed radially inwardly. When shoulders 68 pass entirely through opening 29, legs 52 resiliently expand radially outwardly to retain fastener 20 in doorframe 28. Umbrella 40 can flex axially upwardly as ribs 76, 78 of seal 24 encounter the surface of doorframe 28.

The resilient nature of umbrella 40 and ribs 76, 78 enable ribs 76, 78 to exert a force on the surface of doorframe 28 and form inner and outer seals there along. Ribs 76, 78 may deform radially outwardly as fastener 20 is inserted into doorframe 28. The resilient nature of umbrella 40 and inner and outer ribs 76, 78 along with the differing lengths of ribs 76, 78 can accommodate varying thicknesses T of doorframes 28. That is, the use of resilient seal 24 along with umbrella 40 can allow fastener 20 to be inserted into doorframes 28 having varying thicknesses T while still providing a desired seal against the surface of doorframe 28 around opening 29. Thus, a fastener 20 according to the present teachings can be a single-piece fastener that can be used to seal around the opening of a doorframe and can accommodate varying thicknesses of the doorframe.

Figure 9:
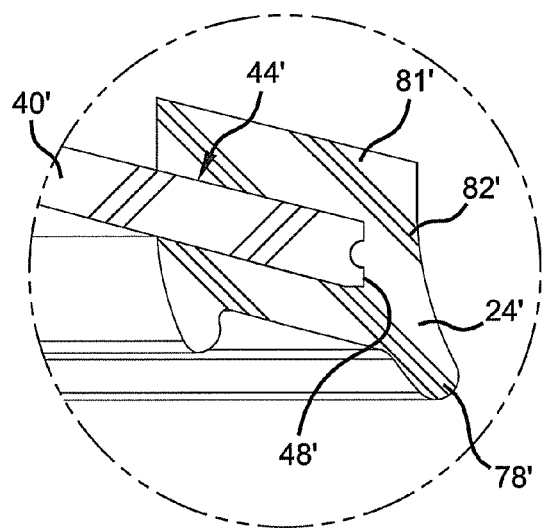
FIG. 9 is an alternate configuration for the seal member relative to the umbrella similar to that shown in FIG. 7.

Referring now to FIG. 9, an alternate configuration for a seal 24' is shown. In this configuration, seal 24' includes a radially extending upper portion 81' that extends along an upper surface 44' of umbrella 40' adjacent sidewall 48'. Upper portion 81' is integral with upper portion 82' of outer rib 78'. Upper portion 81' is thermally bonded to upper surface 44' of umbrella 40'. The inclusion of upper portion 81' can provide an additional mechanical lock and additional surface contact between seal 24' and umbrella 40' to enhance the retention of seal 24' on umbrella 40'.

Figure 10:
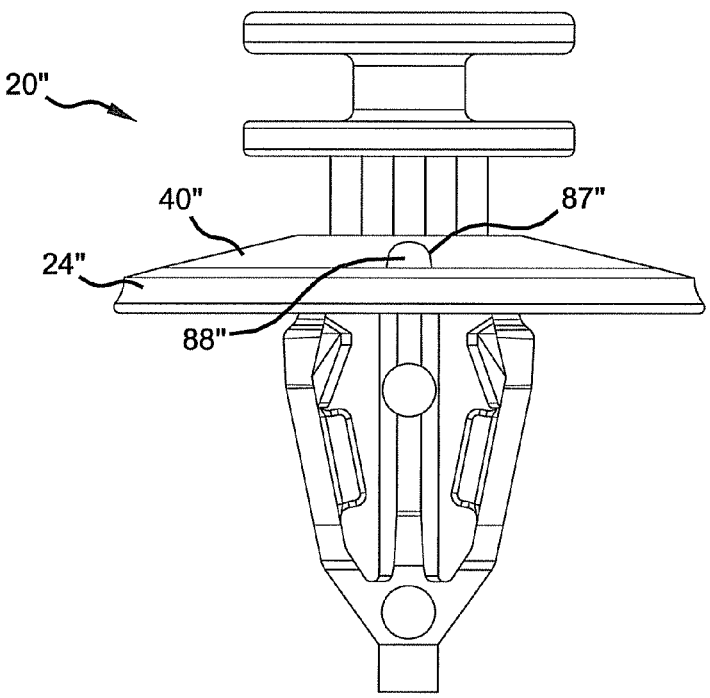
FIG. 10 is a front plan view of an alternate fastener similar to that of FIG. 1 with a slot in the umbrella.
Figure 11:
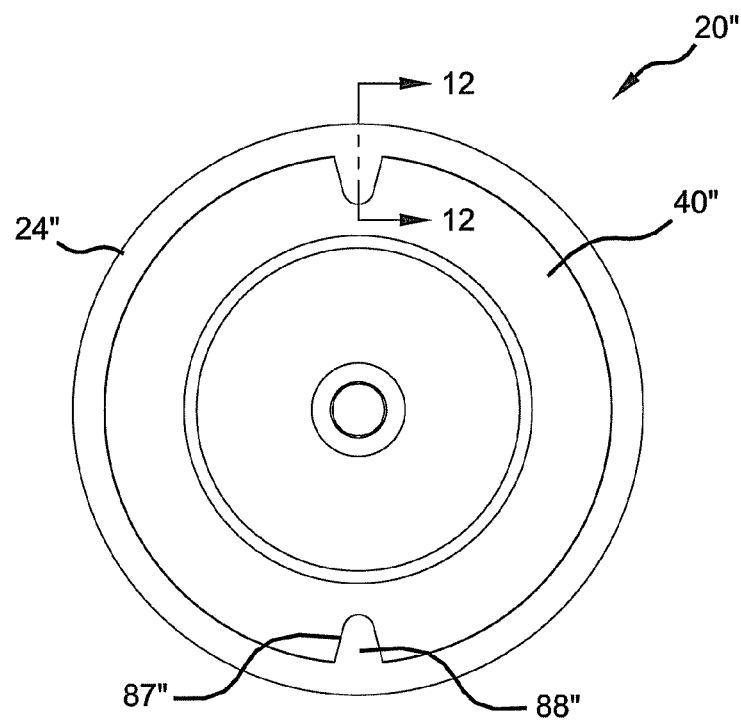
FIG. 11 is a top plan view of the fastener of FIG. 10.
Figure 12:
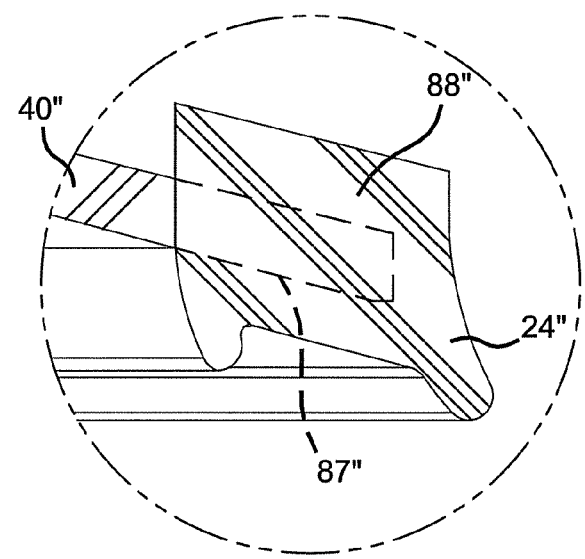
FIG. 12 is an enlarged fragmented cross-sectional view of a portion of the umbrella and seal along line 12-12 of FIG. 10.
Figure 13:
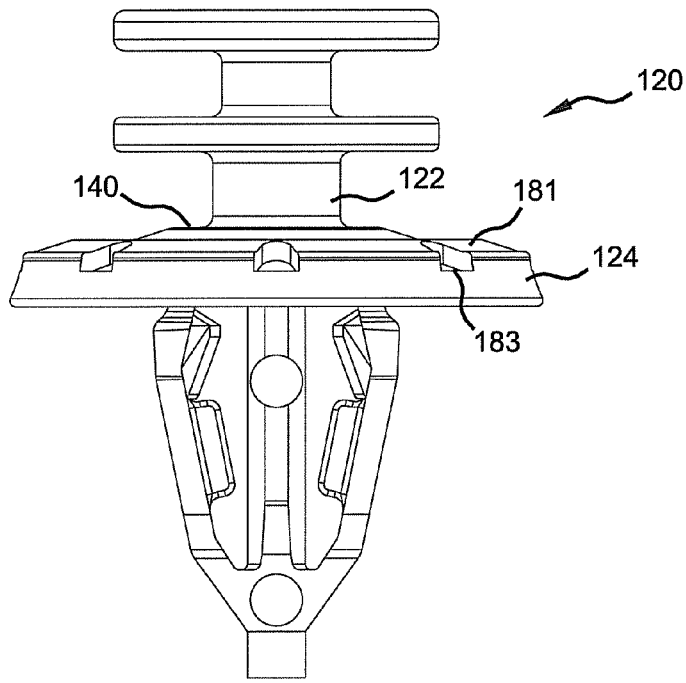
FIG. 13 is a front plan view of a preferred fastener according to the present teachings.
Figure 14:
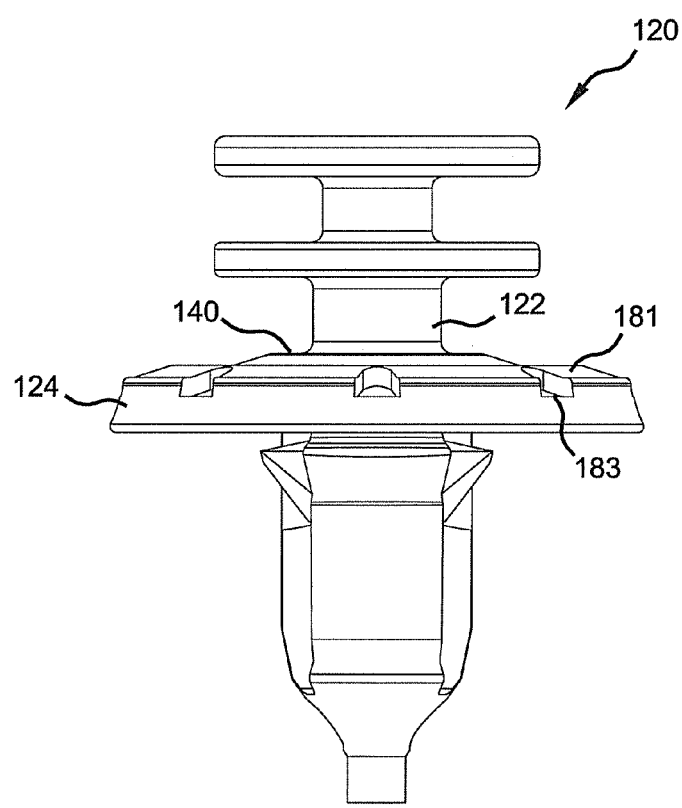
FIG. 14 is a side elevation view of the fastener of FIG. 13.
Figure 15:
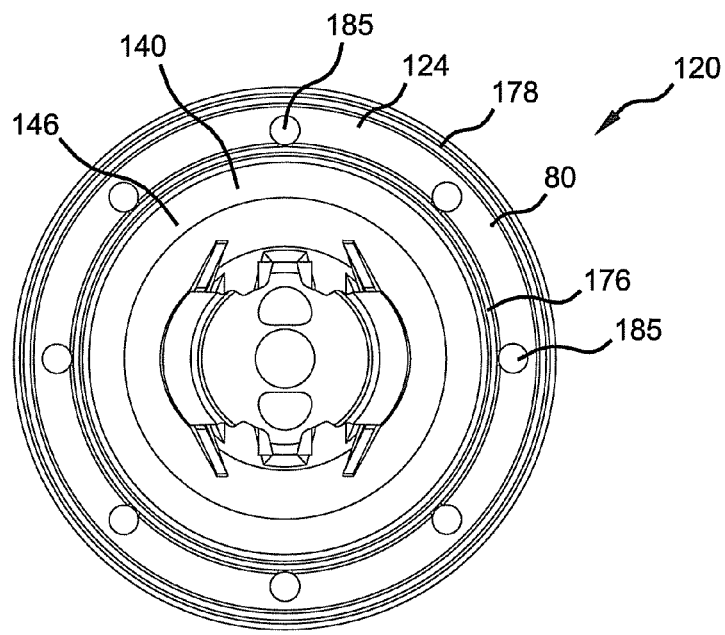
FIGS. 15 and 16 are respective bottom and top plan views of the fastener of FIG. 13.
Figure 16:
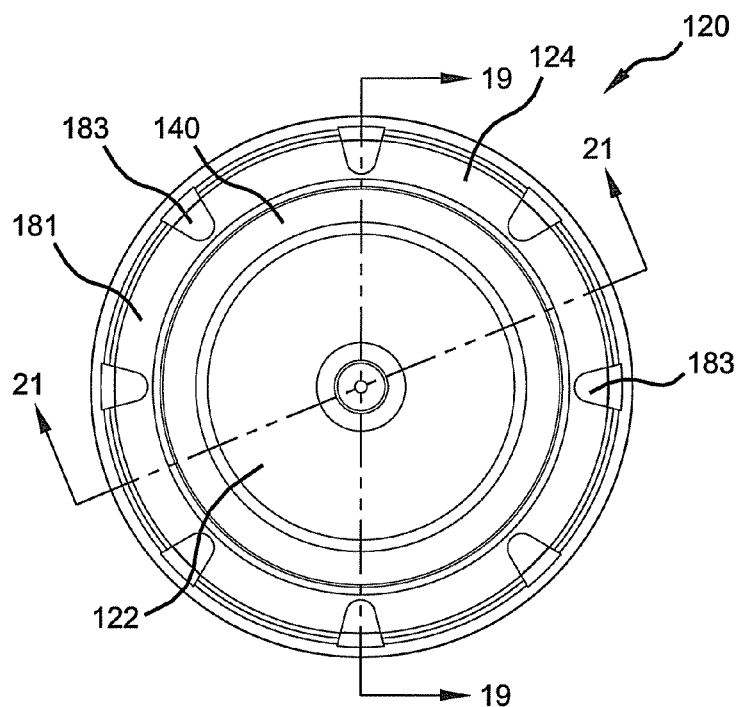
Figure 17:
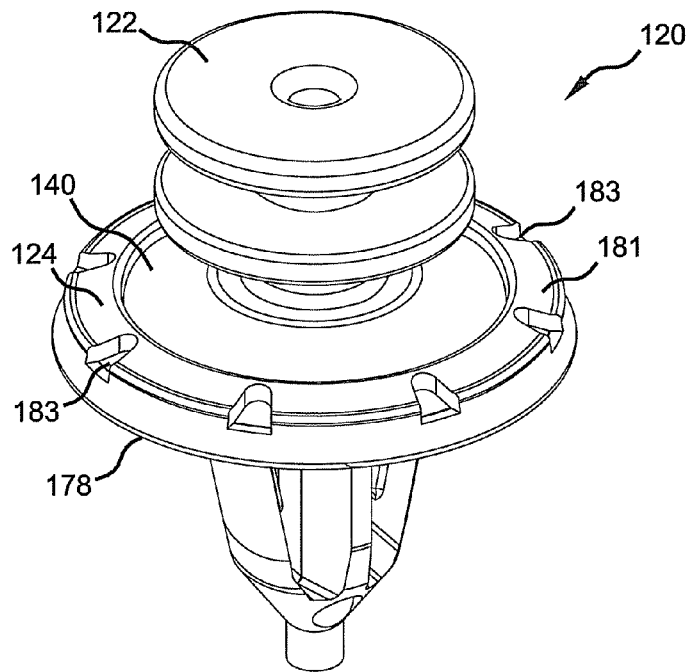
FIGS. 17 and 18 are perspective views of the fastener of FIG. 13.
Figure 18:
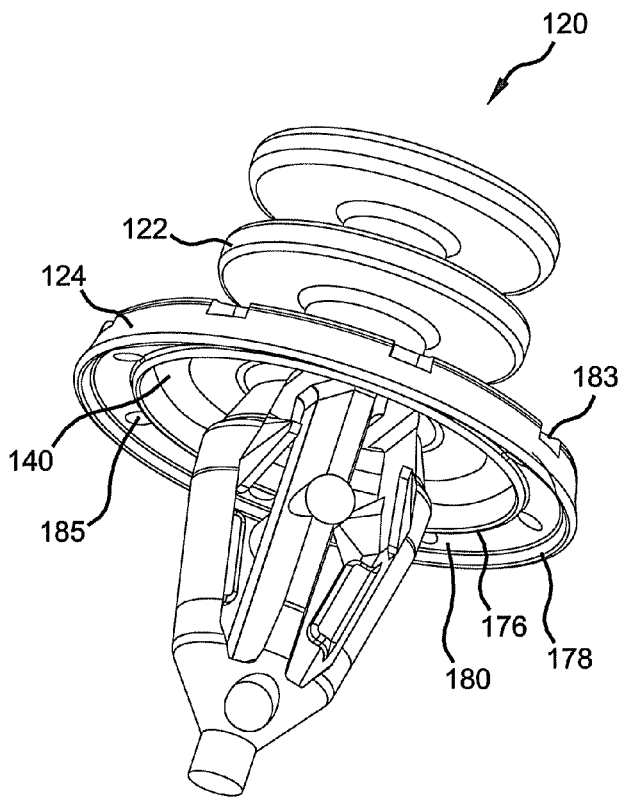
Figure 19:
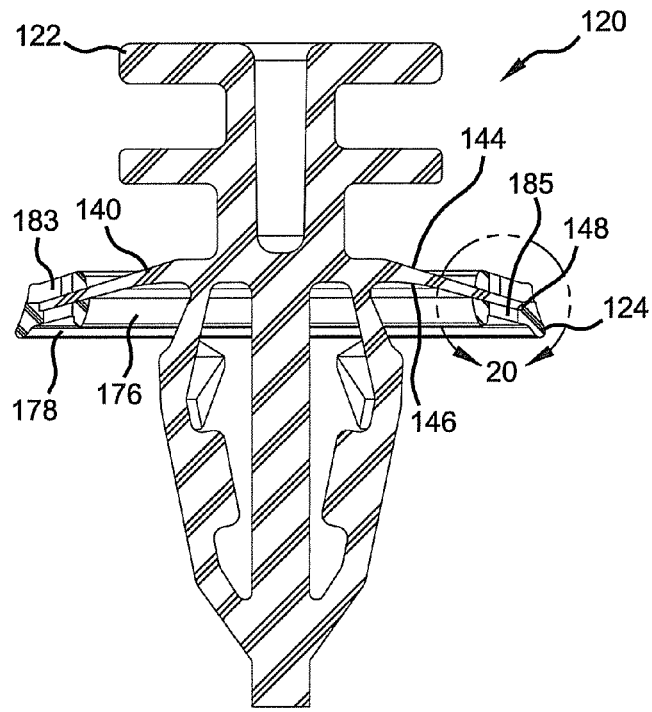
FIG. 19 is cross-sectional view of the fastener along line 19-19 of FIG. 16.
Figure 20:
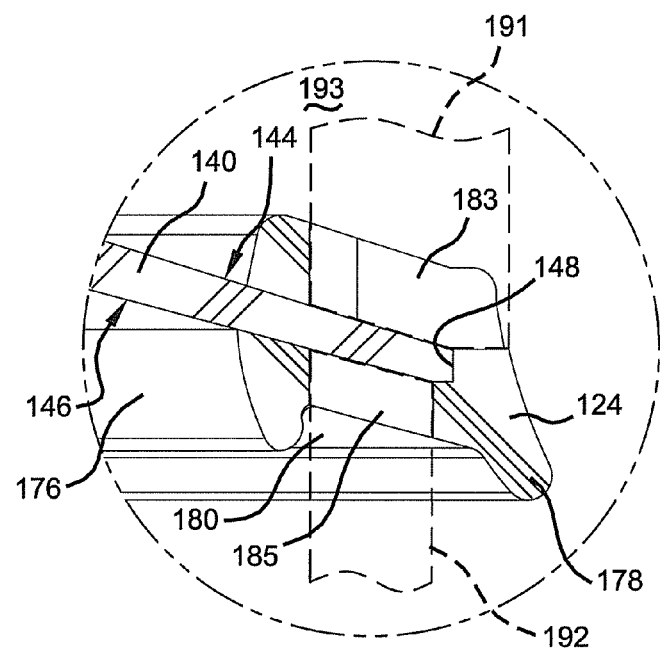
FIG. 20 is an enlarged fragmented view of a portion of the umbrella and seal within circle 20 of FIG. 19 and also shows a portion of the molding process.
Figure 21:
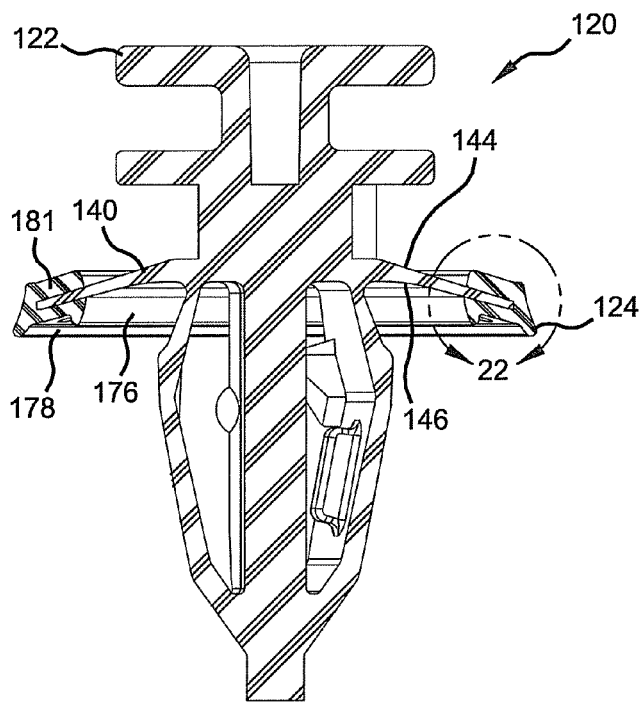
FIG. 21 is a cross-sectional view of the fastener along line 21-21 of FIG. 16.
Figure 22:
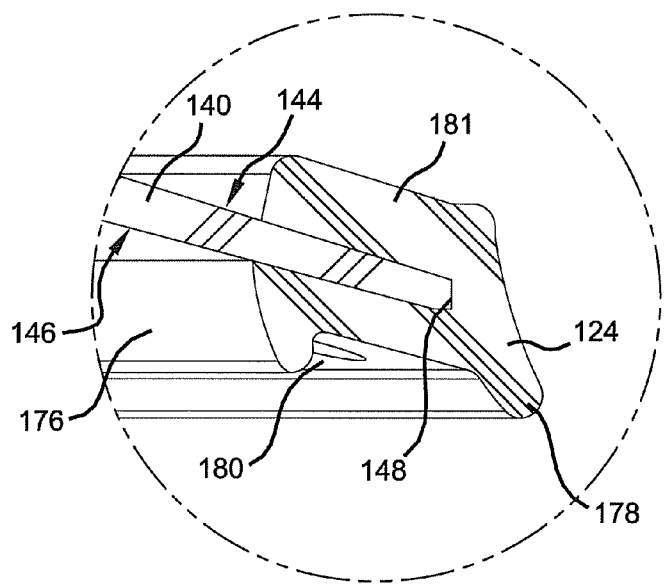
FIG. 22 is an enlarged fragmented view of the portion of the umbrella and seal within circle 22 of FIG. 21.
Figure 23:
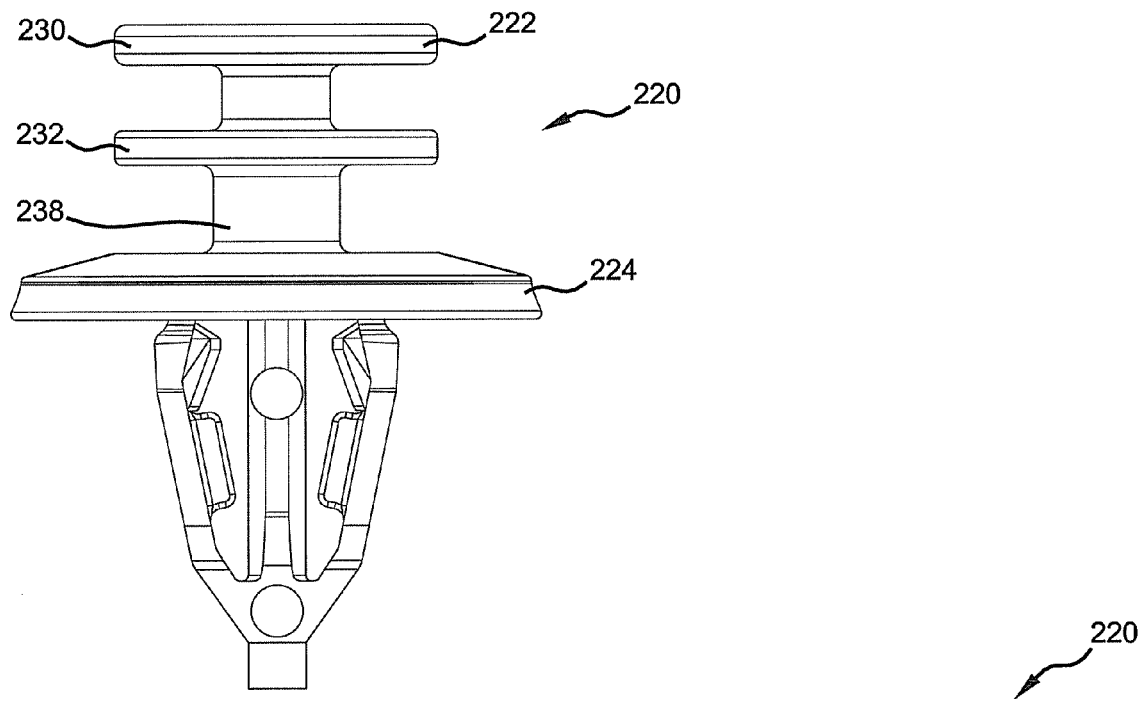
FIG. 23 is a front elevation view of another alternate fastener according to the present teachings.
Figure 24:
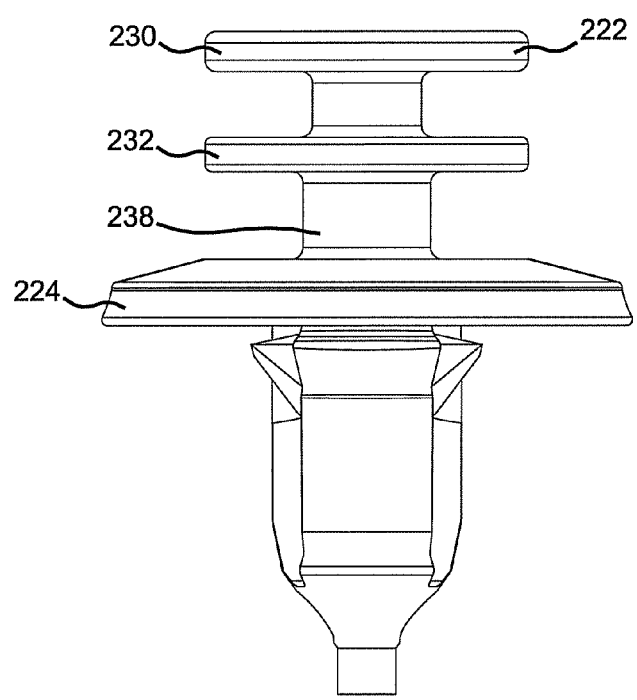
FIG. 24 is a side elevation view of the fastener of FIG. 23.
Figure 25:
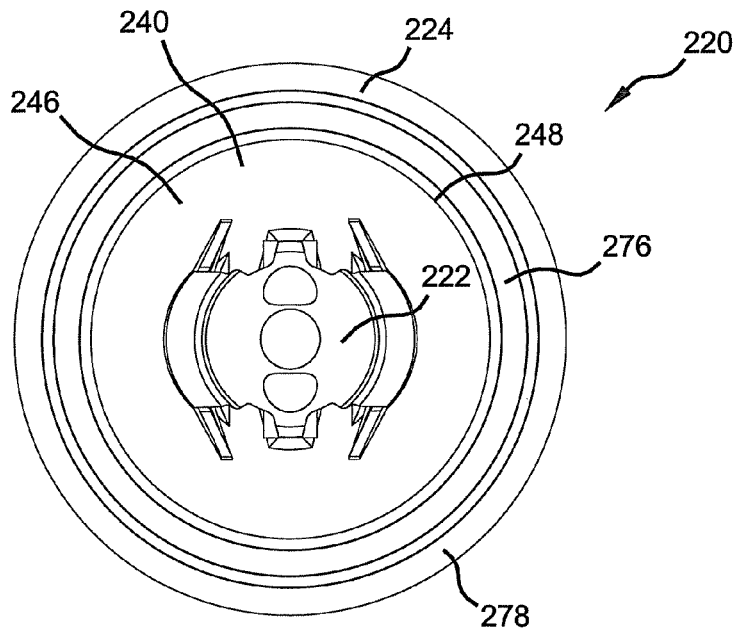
FIGS. 25 and 26 are respective bottom and top plan views of the fastener of FIG. 23.
Figure 26:
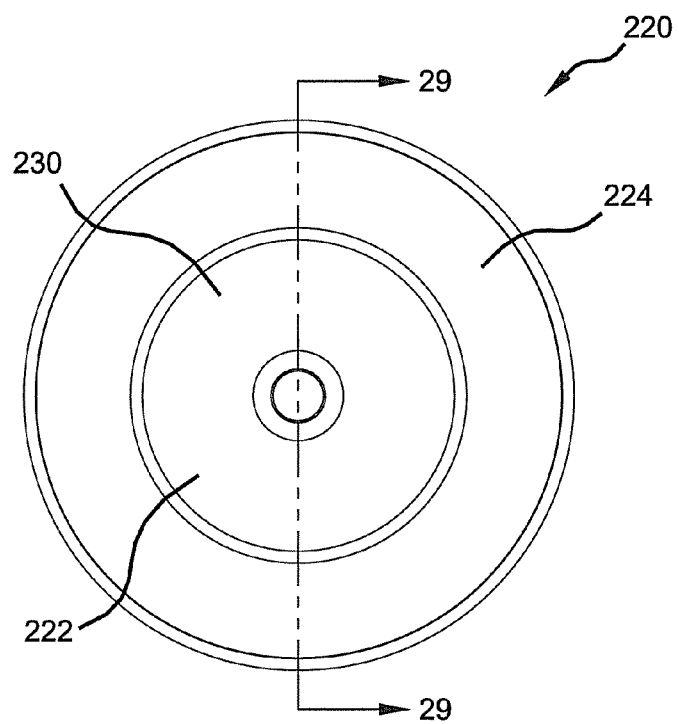
Figure 27:
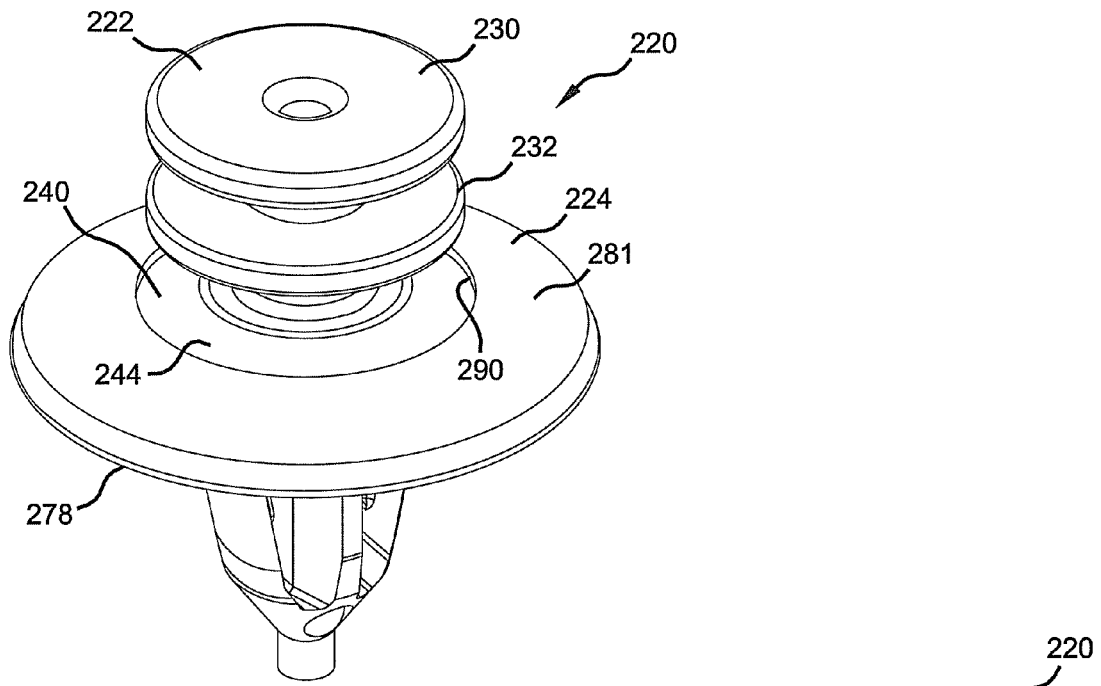
FIGS. 27 and 28 are perspective views of the fastener of FIG. 23.
Figure 28:
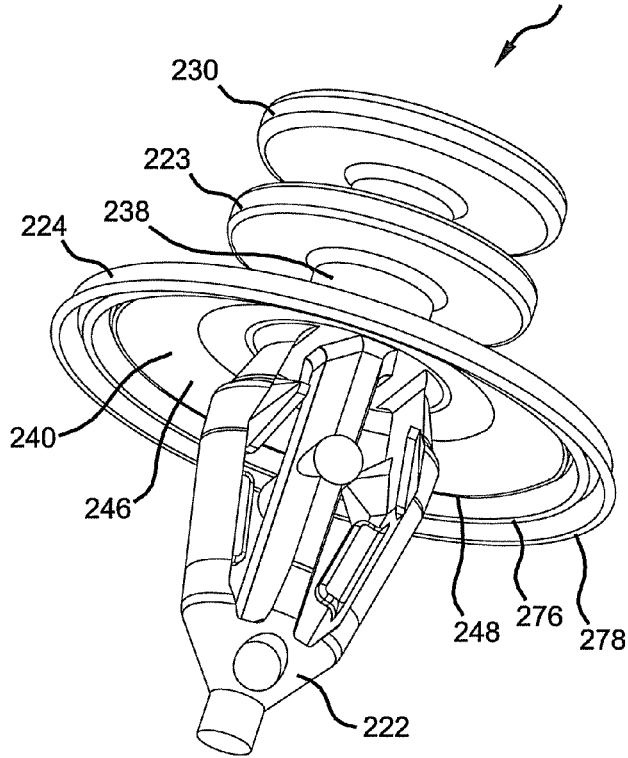

Referring now to FIGS. 10-12, a fastener 20" can include an umbrella 40" having one or more (two shown) radially inwardly extending slots 87" that extend radially inwardly from the peripheral sidewall of umbrella 40". Seal 24" can include a radially inwardly extending portion 88" that extends into slot 87" during the molding process. The inclusion of slot 87" and the portion 88" of seal 24" provides an additional mechanical lock and also increases the contact surface area between seal 24" and umbrella 40" such that retention of seal 24" on umbrella 40" can be enhanced.

Referring now to FIGS. 13-22, a preferred fastener 120 according to the present teachings includes a clip 122 and a seal 124. Clip 122 is similar to clip 22 discussed above. As such, clip 122 will not be described in detail. Seal 124 includes an upper portion 181 that extends along a portion of upper surface 144 of umbrella 140 adjacent sidewall 148. Seal 124 also includes inner and outer ribs 176, 178 and connecting portion 180 that extend along lower surface 146 of umbrella 140. Seal 124 includes a plurality of voids or discontinuities 183 in upper portion 181. Voids 183 can be equally spaced around seal 124. Seal 124 also includes a plurality of voids or discontinuities 185 in connecting portion 180. Voids 185 can be equally spaced around seal 124. Voids 185 can be aligned with voids 183. Voids 183, 185 allow access to the respective upper and lower surfaces 144, 146 that would otherwise be covered by seal 124.

Voids 183, 185 can be formed during the molding process. In particular, mold features or projections 191, 192 (shown in phantom in FIG. 20) on the cavities of mold 193 used during the second shot of the molding process can contact upper and lower surfaces 144, 146 of umbrella 140 and hold umbrella 140 stationary during the overmolding of seal 124 onto umbrella 140. As a result, the mold features 191, 192 can form voids 183, 185. The contacting of upper and lower surface 144, 146 of umbrella 140 during the overmolding process can advantageously maintain umbrella 140 in a desired orientation during the overmolding process. This contact can thereby inhibit warping or deformation of umbrella 140 during the overmolding process. As a result, umbrella 140 can achieve better positional tolerances at the conclusion of the forming of fastener 120 and ribs 176, 178 can be more accurately positioned.

The voids 183, 185 represent areas where the material of seal 124 is not present. These voids, however, are not believed to adversely affect the ability of seal 124 to be thermally bonded to umbrella 140 due to the decreased surface area of contact between seal 124 and umbrella 140. Voids 185 do not affect the ability of ribs 176, 178 to seal against the doorframe. If desired, voids 183, 185 can be nonaligned with one another such that the support provided for umbrella 140 is staggered along the upper and lower surfaces 144, 146, thereby providing a different level of support to umbrella 140 during the overmolding process. Seal 124 is thermally bonded to umbrella 140.

During use, umbrella 140 and inner and outer ribs 176, 178 will flex as fastener 120 is inserted into a doorframe. The resilient nature of umbrella 140 and of seal 124 will resist the flexing and can provide a seal around the opening in the doorframe to inhibit the transmission of moisture, fluids, debris, and sound through the opening in the doorframe. Additionally, the resilient nature enables fastener 120 to seal against doorframes having varying thicknesses T.

Figure 29:
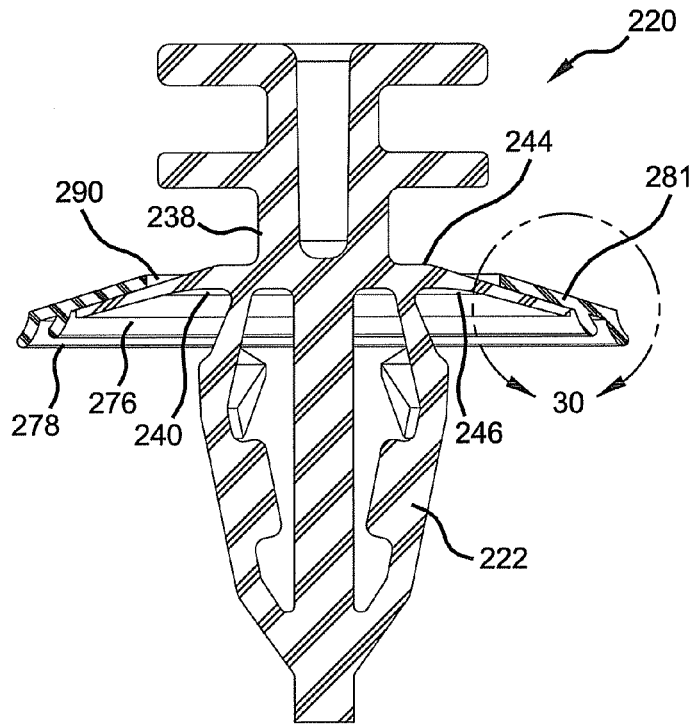
FIG. 29 is a cross-sectional view of the fastener along line 29-29 of FIG. 26.
Figure 30:
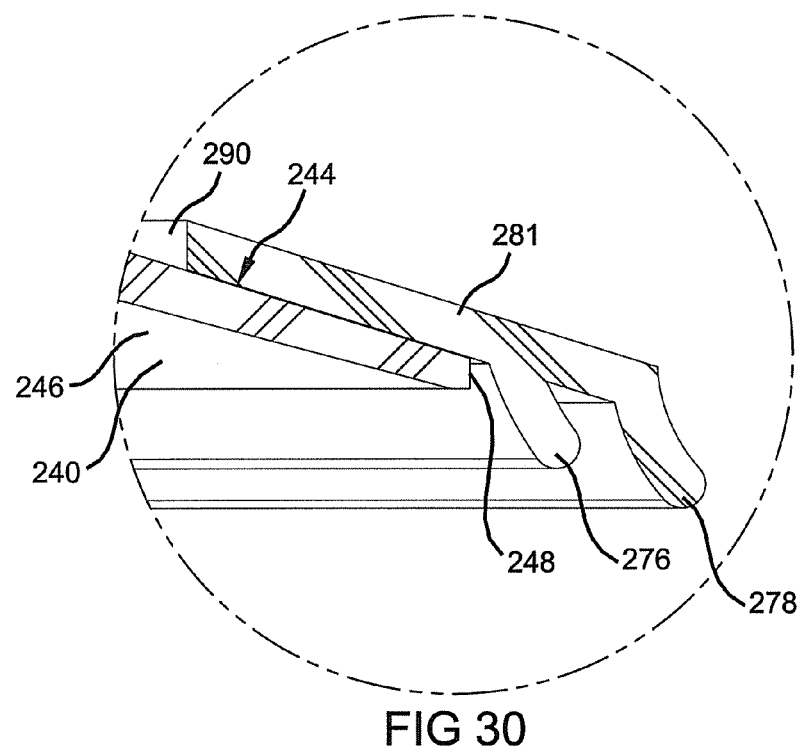
FIG. 30 is an enlarged fragmented view of a portion of the umbrella and seal within circle 30 of FIG. 29.

Referring now to FIGS. 23-30, an alternate fastener 220 according to the present teachings includes a relatively hard clip 222 and a relatively soft seal 224. Clip 222 is similar to clip 22 described above. As such, clip 222 will not be described in detail. In fastener 220, seal 224 is overmolded and engaged with upper surface 244 of umbrella 240. Seal 224 is not bonded to lower surface 246 or peripheral sidewall 248 of umbrella 240. Upper portion 281 of seal 224 extends radially outwardly beyond peripheral sidewall 248 of umbrella 240, as best seen in FIGS. 29 and 30. Inner and outer ribs 276, 278 are both located radially outwardly from sidewall 248 of umbrella 240. Upper portion 281 can have an inner peripheral sidewall 290 that is radially closer to lower neck 238 than the outer periphery of collar 232 and/or head 230.

During use, umbrella 240 and inner and outer ribs 276, 278 will flex as fastener 220 is inserted into a doorframe. The resilient nature of umbrella 240 and of seal 224 will resist the flexing and can provide a seal around the opening in the doorframe to inhibit the transmission of moisture, fluids, debris, and sound through the opening in the doorframe. The overmolding of seal 224 entirely on the upper surface 244 of umbrella 240 can facilitate manufacturing by allowing the mold cavity to support lower surface 246 of umbrella 240 during the overmolding process. The supporting of lower surface 246 of umbrella 240 can inhibit the warping or deformation of umbrella 240 during the overmolding process and produce a fastener 220 with tighter tolerances. Seal 224 is thermally molded to umbrella 240. The flexible nature of umbrella 240 and seal 224 enable fastener 220 to form a seal around an opening in a doorframe having varying thicknesses T.

Figure 31:
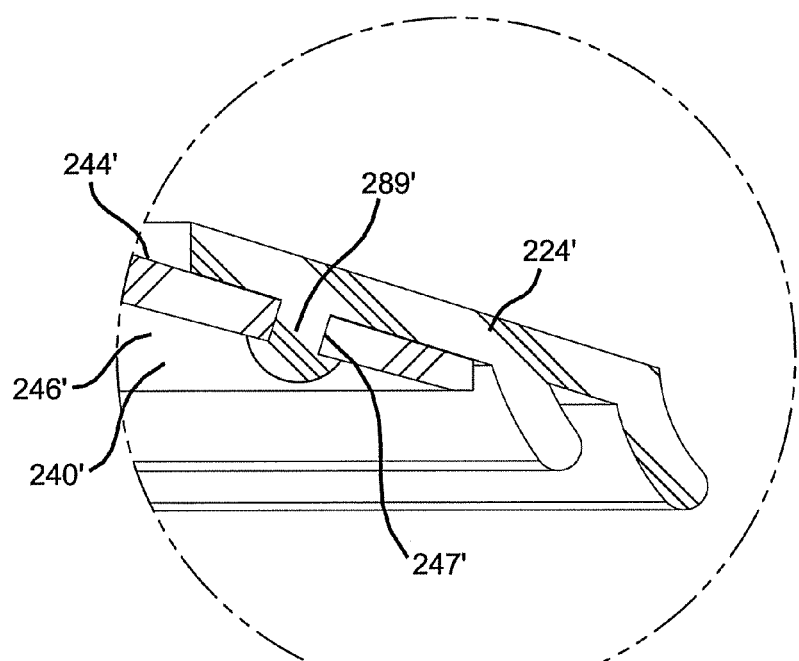
FIG. 31 is an alternate configuration for the seal member relative to the umbrella similar to that shown in FIG. 30.

Modifications to fastener 220 can be utilized to enhance the retention of seal 224 on umbrella 240. For example, as shown in FIG. 31, umbrella 240' can have a plurality of openings 247' that extend therethrough from upper surface 244' to lower surface 246'. Openings 247' can be spaced apart along umbrella 240'. Openings 247' allow seal 224' to extend therethrough during the overmolding process. In particular, seal 224' can include a plurality of axially extending retaining projections 289' that extend through openings 247'. The engagement between retaining projection 289' and opening 247' provides a mechanical lock securing seal 224' to umbrella 240'. Optionally, projection 289' can extend along a portion of lower surface 246' of umbrella 240' adjacent opening 247' to provide additional mechanical locking. The configuration shown in FIG. 31 still allows a majority of lower surface 246' of umbrella 240' to be supported during the overmolding process, thereby inhibiting the warping or deformation of umbrella 240' during the overmolding process and allowing tighter tolerances.

Figure 32:
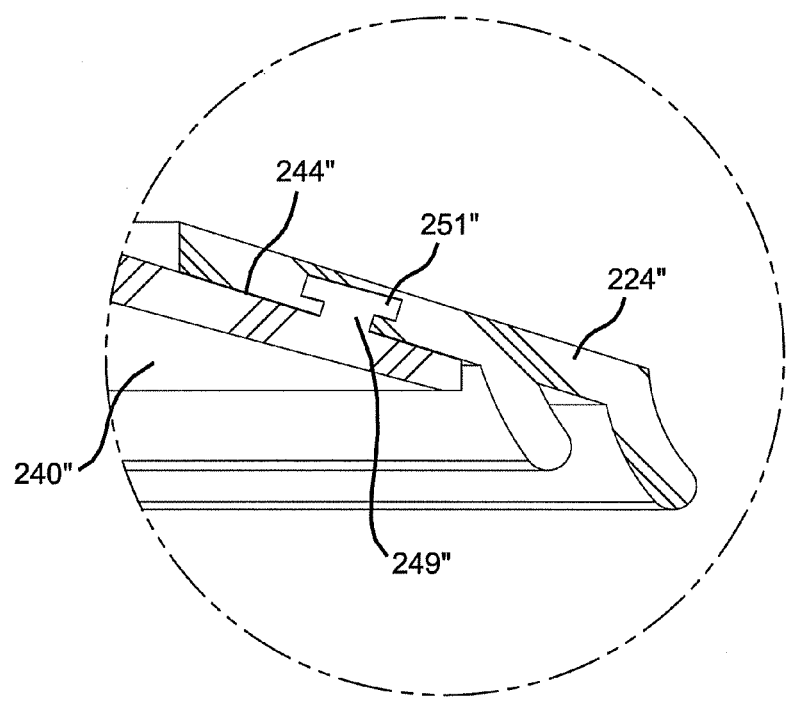
FIG. 32 is still another alternate configuration for the seal member relative to the umbrella similar to that shown in FIG. 30.
Figure 33:
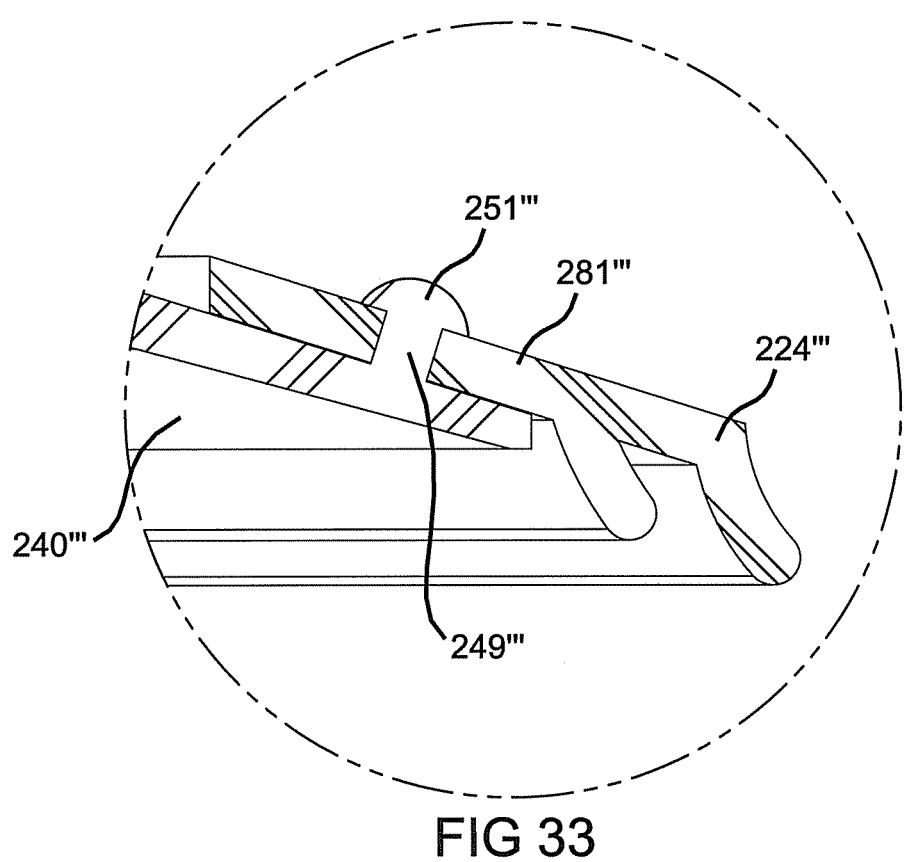
FIG. 33 is yet another alternate configuration for the seal member relative to the umbrella similar to that shown in FIG. 30.
Figure 34:
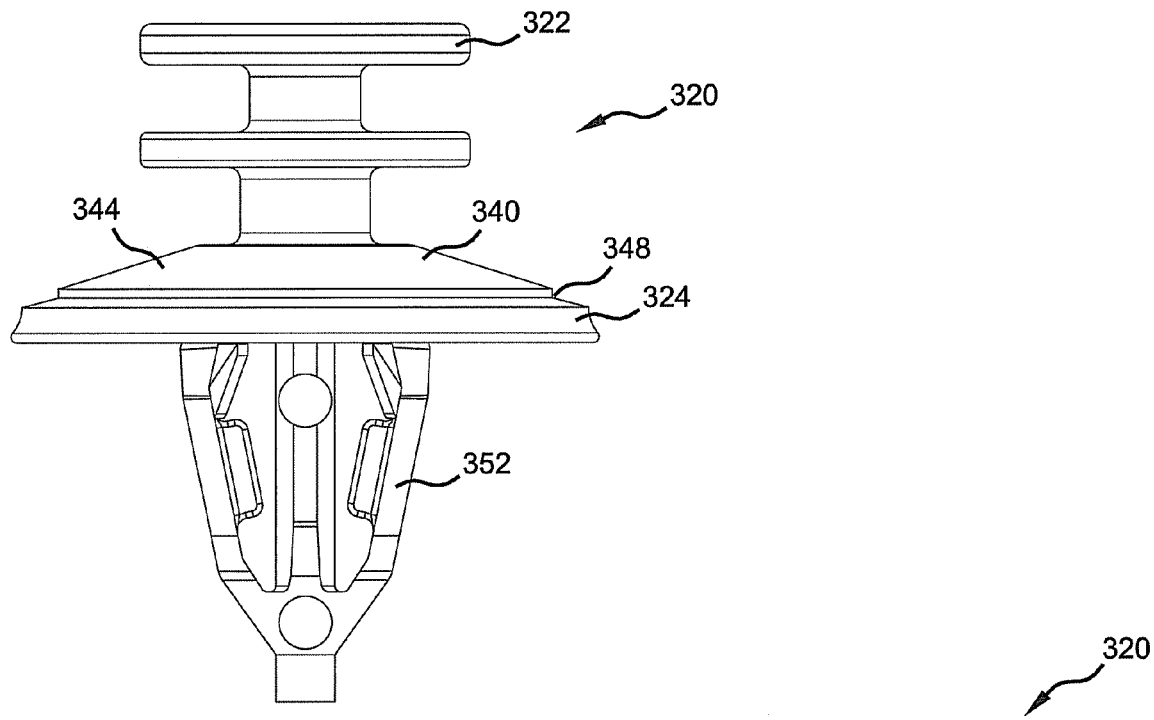
FIG. 34 is a front elevation view of yet another alternate fastener according to the present teachings.
Figure 35:
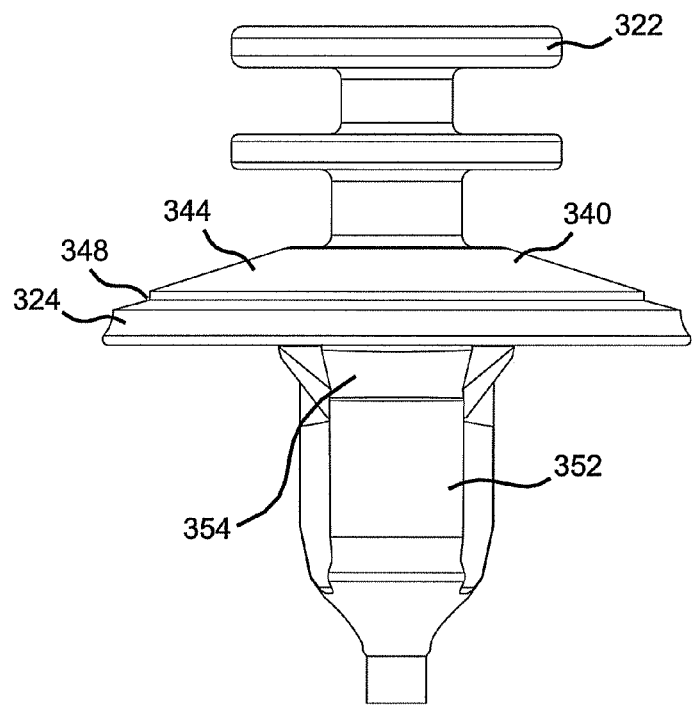
FIG. 35 is a side elevation view of the fastener of FIG. 34.
Figure 36:
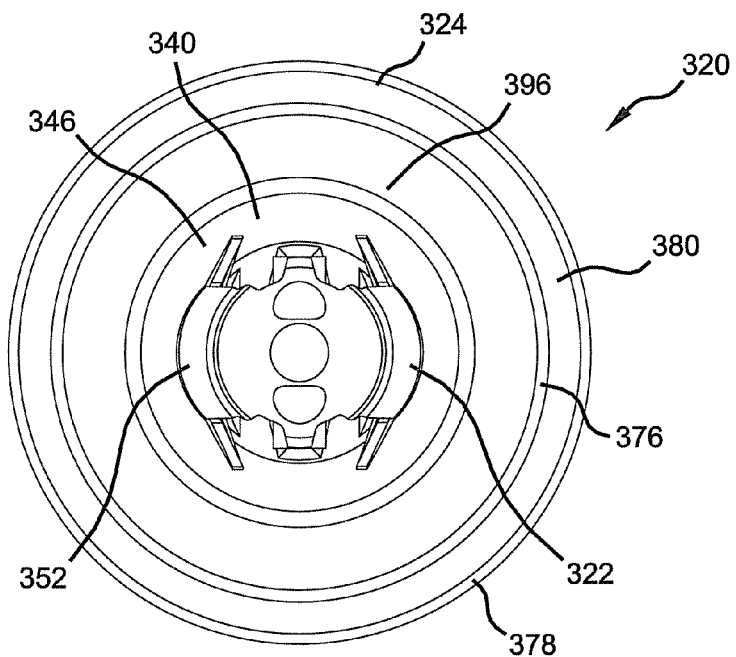
FIGS. 36 and 37 are respective bottom and top plan views of the fastener of FIG. 34.
Figure 37:
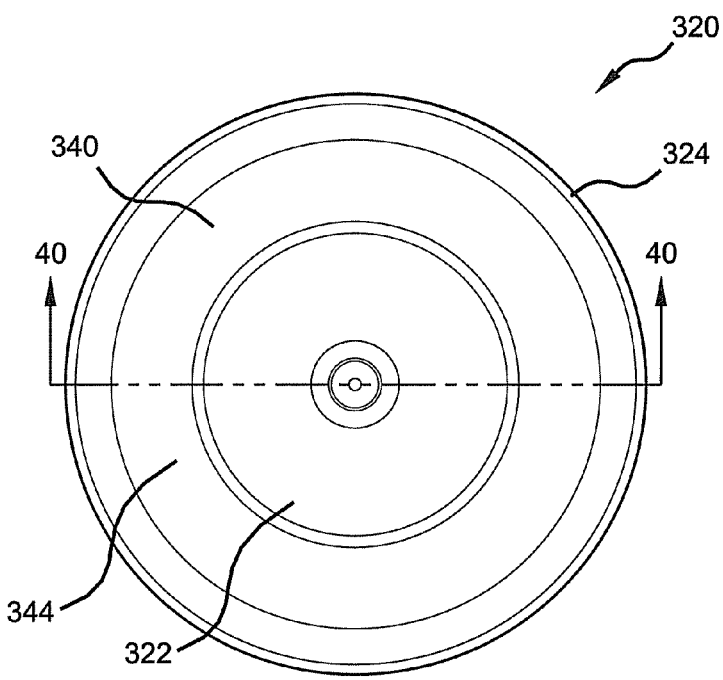
Figure 38:
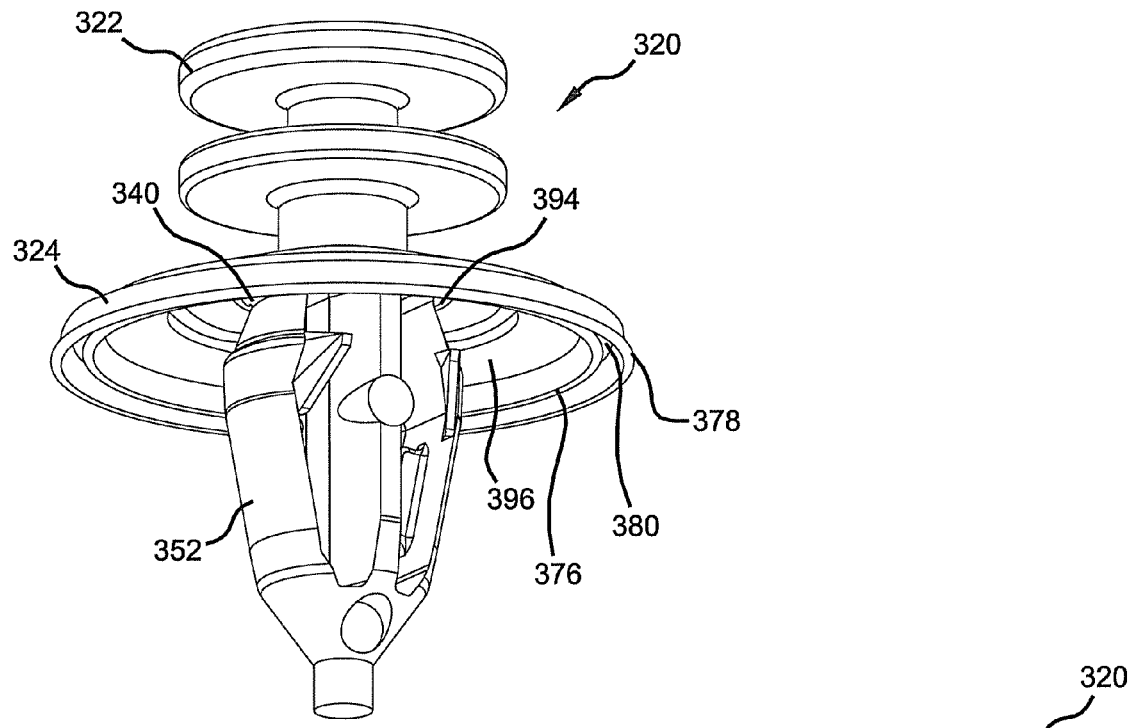
FIGS. 38 and 39 are perspective views of the fastener of FIG. 34.
Figure 39:
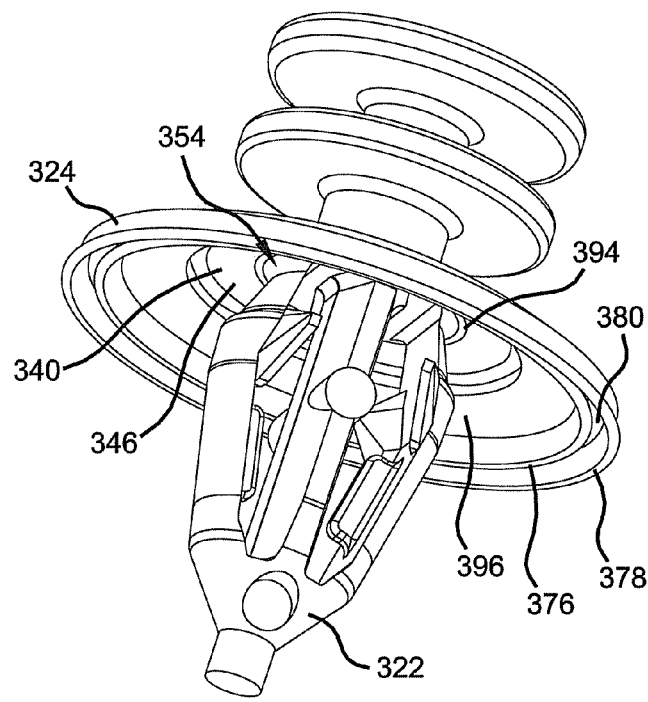
Figure 40:
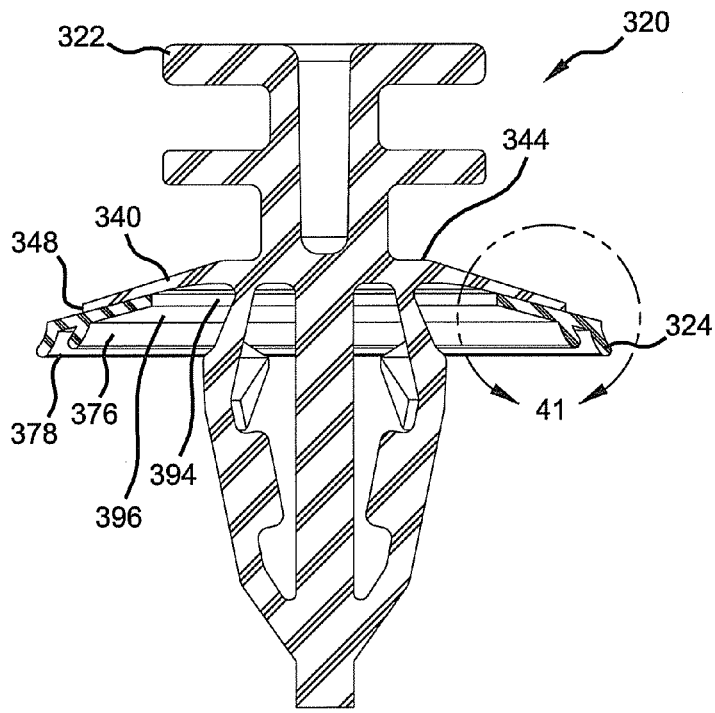
FIG. 40 is a cross-sectional view of the fastener along line 40-40 of FIG. 37.
Figure 41:
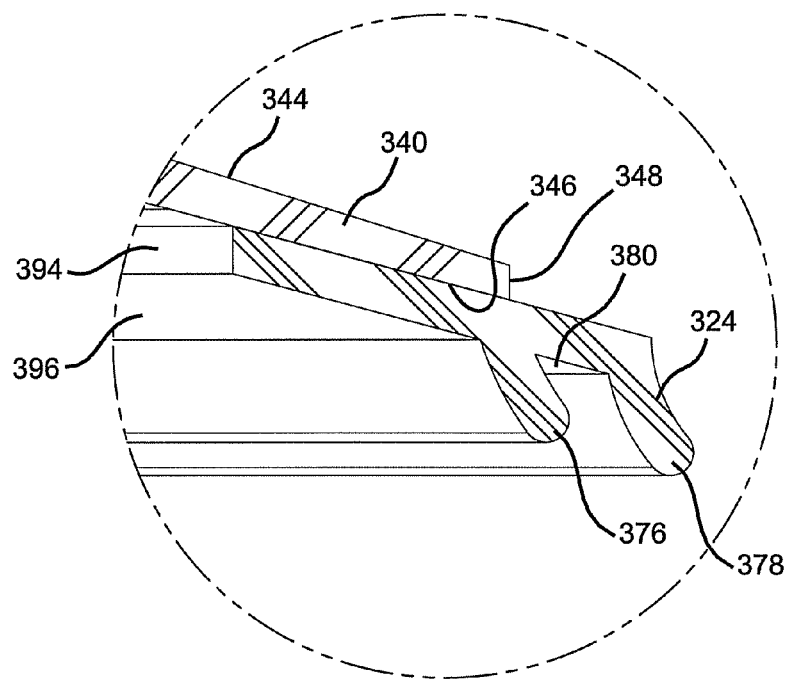
FIG. 41 is an enlarged fragmented view of the portion of the umbrella and seal within circle 40 of FIG. 40.

Referring now to FIGS. 32 and 33, additional alternate configurations for fastener 220 that enhance the retention between the seal and the umbrella are shown. In particular, umbrella 240" can include an axially extending projection 249" that extends from upper surface 244". Projections 249" can be spaced along umbrella 240" and seal 224" can be overmolded onto projections 249". The extension of projections 249" into seal 224" thereby provides an additional mechanical lock to enhance the retaining of seal 224" on umbrella 240". Optionally, projection 249" can have a radially extending head 251" that can further enhance the mechanical locking between seal 224" and umbrella 240".

As shown in FIG. 33, projection 249'" can extend upwardly beyond the surface of upper portion 281'". In this alternate configuration, optional head 251'" can extend along a portion of upper portion 281'", thereby enhancing the mechanical lock between seal 224'" and umbrella 240'". In both the configurations shown in FIGS. 32 and 33, the underside of the umbrella can be supported during the overmolding process, thereby inhibiting the warping or deformation of the umbrella during the overmolding process and allowing tighter tolerances.

Referring to FIGS. 34-41, another alternate fastener 320 according to the present teachings is shown. Fastener 320 includes a relatively hard clip 322 with a relatively soft seal 324 overmolded thereon. Clip 322 is similar to clip 22 discussed above. As such, clip 322 will not be described in detail. Seal 324 is overmolded onto lower surface 346 of umbrella 340 and forms a thermal bond therewith. Seal 324 is not overmolded onto upper surface 344 or peripheral sidewall 348 of umbrella 340. Seal 324 includes inner and outer ribs 376, 378 and a connecting portion 380 therebetween. Seal 324 also includes a radially inwardly extending inner portion 396 that extends from the juncture of connecting portion 380 and inner rib 376. Inner portion 396 can extend radially inwardly along a portion of lower surface 346 of umbrella 340. An inner peripheral sidewall 394 can be located a desired distance from upper portion 354 of legs 352. The location of inner peripheral sidewall 394 can dictate the amount of surface contact between seal 324 and lower surface 346 of umbrella 340. Outer rib 378 can be disposed radially outwardly beyond peripheral sidewall 348 of umbrella 340. Inner rib 376 can be radially disposed adjacent peripheral sidewall 348. If desired, the radial positions of inner and outer ribs 376, 378 can be varied from that shown.

In use, umbrella 340 and inner and outer ribs 376, 378 will resiliently flex as fastener 320 is inserted into a doorframe. The resilient flexing of umbrella 340 and seal 324 resists the insertion and can form a seal around the opening in the doorframe that inhibits liquids, debris and noise from entering through the opening in the doorframe. The flexible nature of umbrella 340 and seal 324 enable fastener 320 to form a seal around an opening in a doorframe having varying thicknesses T.

When molding fastener 320, the cavity used for the overmolding of seal 324 onto umbrella 340 can include features that support upper surface 344 of umbrella 340. This support can inhibit deformation or warping of umbrella 340 during overmolding of seal 324 thereto and allow tighter tolerances.

Figure 42:
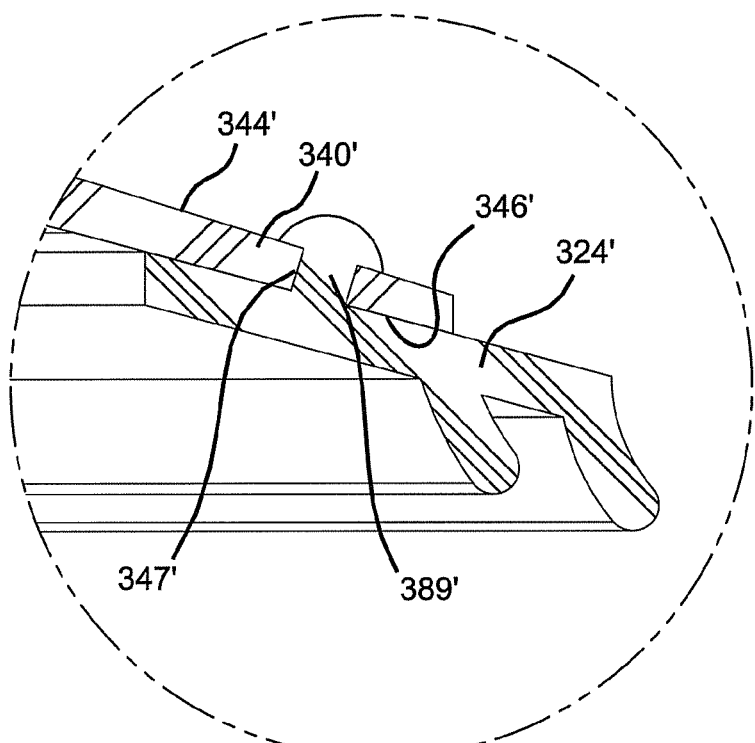
FIG. 42 is an alternate configuration for the seal member relative to the umbrella similar to that shown in FIG. 41.

Modifications to fastener 320 can be utilized to enhance the retention of seal 324 on umbrella 340. For example, as shown in FIG. 42, umbrella 340' can have a plurality of openings 347' that extend therethrough from upper surface 344' to lower surface 346'. Openings 347' can be spaced apart along umbrella 340'. Openings 347' allow seal 324' to extend therethrough during the overmolding process. In particular, seal 324' can include a plurality of axially extending retaining projections 389' that extend through openings 347'. The engagement between retaining projection 389' and opening 347' provides a mechanical lock securing seal 324' to umbrella 340'. Optionally, projection 389' can extend along a portion of upper surface 344' of umbrella 340' adjacent opening 347' to provide additional mechanical locking. The configuration shown in FIG. 42 still allows a majority of upper surface 344' of umbrella 340' to be supported during the overmolding process, thereby inhibiting the warping or deformation of umbrella 340' during the overmolding process and allowing tighter tolerances.

Figure 43:
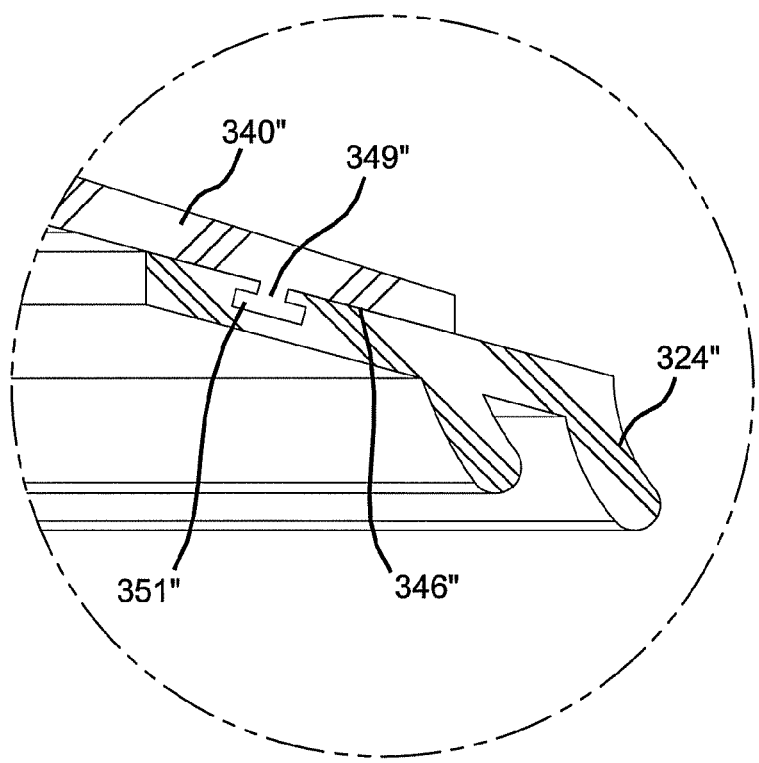
FIG. 43 is still another alternate configuration for the seal member relative to the umbrella similar to that shown in FIG. 41.
Figure 44:
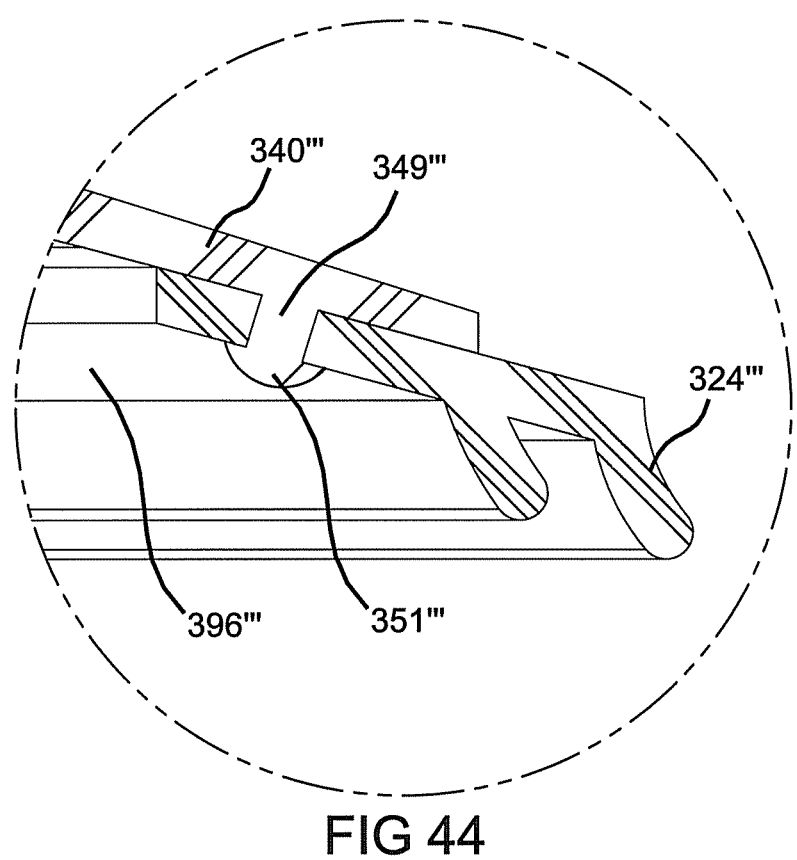
FIG. 44 is yet another alternate configuration for the seal member relative to the umbrella similar to that shown in FIG. 41.

Referring now to FIGS. 43 and 44, additional alternate configurations for fastener 320 that enhance the retention between the seal and the umbrella are shown. In particular, umbrella 340" can include an axially extending projection 349" that extends from lower surface 346". Projections 349" can be spaced along umbrella 340" and seal 324" can be overmolded onto projections 349". The extension of projections 349" into seal 324" thereby provides an additional mechanical lock to enhance the retaining of seal 324" on umbrella 340". Optionally, projection 349" can have a radially extending head 351" that can further enhance the mechanical locking between seal 324" and umbrella 340".

As shown in FIG. 44, projection 349'" can extend downwardly beyond the surface of inner portion 396'". In this configuration, optional head 351'" can extend along a portion of inner portion 396'", thereby enhancing the mechanical lock between seal 324'" and umbrella 340". In both the configurations shown in FIGS. 43 and 44, the upperside of the umbrella can be supported during the overmolding process, thereby inhibiting the warping or deformation of the umbrella during the overmolding process and allowing tighter tolerances.

Referring to FIGS. 45-49, another preferred single-piece fastener 420 according to the present teachings is shown. Fastener 420 includes a clip 422 and a seal 424 attached thereto. Clip 422 is a relatively hard and rigid piece while seal 424 is a relatively soft and flexible piece. Fastener 420 is operable to retain a panel, such as a door panel 426, to a frame or support member, such as doorframe 428, as shown in FIG. 49. Seal 424 is operable to seal against doorframe 428 to inhibit moisture, liquids, debris, and noise from entering into the interior of the automotive vehicle through doorframe 428.

Clip 422 includes a generally-circular head 430 and a generally-circular collar 432 with a cylindrical neck 434 therebetween. Head 430 and neck 434 are configured to fit within a doghouse assembly 436 coupled to door panel 426. Doghouse assembly 436 can be mounted to door panel 426, co-molded with door panel 426 or otherwise secured to door panel 426. Head 430 and collar 432 limit axial movement of fastener 420 relative to doghouse assembly 436 and door panel 426.

Clip 422 includes a lower neck 438 below collar 432 that extends to an umbrella or flange 440. Umbrella 440 extends radially outwardly and axially downwardly from neck 438. Umbrella 440 includes an upper surface 444, a lower surface 446, and a peripheral sidewall 448 extending therebetween. Umbrella 440 can be circular. Below umbrella 440, clip 422 includes a central post 450 and a pair of legs 452 that are spaced 180 degrees from one another and are spaced apart from post 450. Upper portions 454 of legs 452 are connected to umbrella 440 adjacent post 450 while lower portions 456 are connected to post 450 adjacent a tip 458 of clip 422.

The merging of legs 452 with post 450 adjacent tip 458 forms a tapering lead-in 460 that facilitates guiding of the lower portion of clip 422 into an opening 429 in doorframe 428. A first intermediate portion 462 of legs 452 tapers radially outwardly as legs 452 extend axially upwardly toward a second intermediate portion 466. Second intermediate portion 466 continues to taper radially outwardly as it extends axially upwardly but at a lesser rate than first intermediate portion 462. Legs 452 include a shoulder 468 at the upper end of second intermediate portion 466. Above shoulder 468, upper portion 454 tapers radially inwardly as legs 452 extend axially from shoulder 468 toward umbrella 440.

Legs 452 can each include a pair of wings 470 that extend therefrom. Wings 470 in conjunction with shoulders 468 interact with the opening 429 in doorframe 428 to retain clip 422 therein. Each leg 452 can include a rib 472 that extends radially inwardly from the inner surface thereof. Ribs 472 can be compressed against post 450 when attempting to withdraw fastener 420 from doorframe 428. Ribs 472 can limit the radially inward movement of each leg 452 such that both legs 452 must be moved radially inwardly to remove fastener 420 from doorframe 428. Ribs 472 can enhance the retention of fastener 420 within doorframe 428. Ribs 472 can also help to distribute the insertion force across legs 452 along with providing a centering effect for fastener 420 during insertion.

Post 450 has a pair of radially outwardly extending ribs 473 generally aligned with legs 452. Ribs 473 can limit the radially inward movement of upper portion 454 of legs 452 during the insertion and extraction of fastener 420 into and out of doorframe 428. Ribs 473 can also provide a self-centering feature for fastener 420 to facilitate the alignment of fastener 420 with the opening in the doorframe 428. Ribs 473 can be dimensioned to work in a complementary fashion with ribs 472 on legs 452. Ribs 473 are preferably on post 450 rather than on upper portions 454 of legs 452 because placement of the ribs on the upper portions 454 may make the legs too stiff and undesirably affect the insertion and/or removal force necessary to use fastener 420.

Seal 424 is generally annular and includes inner and outer axially extending ribs 476, 478 with a connecting portion 480 extending therebetween. Inner rib 476 extends axially from lower surface 446 of umbrella 440 a distance less than that of outer rib 478. Connecting portion 480 and the top side of inner rib 476 extend along lower surface 446 of umbrella 440. Outer rib 478 includes an upper portion 482 that extends along peripheral sidewall 448 of umbrella 440. Seal 424 includes an upper portion 481 that extends from upper portion 482 along a portion of upper surface 444 of umbrella 440 adjacent sidewall 448. Seal 424 is thermally bonded to lower surface 446, peripheral sidewall 448, and upper surface 444 of umbrella 440, as described below. Seal 424 includes a plurality of voids or discontinuities 483 in upper portion 481. Voids 483 can be equally spaced around seal 424. Seal 424 also includes a plurality of voids or discontinuities 485 in connecting portion 480. Voids 485 can be equally spaced around seal 424. Voids 485 can be aligned with voids 483. Voids 483, 485 allow access to the respective upper and lower surfaces 444, 446 that would otherwise be covered by seal 424.

Voids 483, 485 can be formed during the molding process. In particular, mold features or projections on the cavities of the mold used during the second shot of the molding process can contact upper and lower surfaces 444, 446 of umbrella 440 and hold umbrella 440 stationary during the overmolding of seal 424 onto umbrella 440, as discussed above with reference to FIG. 20. As a result, the mold features can form voids 483, 485. The contacting of upper and lower surface 444, 446 of umbrella 440 during the overmolding process can advantageously maintain umbrella 440 in a desired orientation during the overmolding process. This contact can thereby inhibit warping or deformation of umbrella 440 during the overmolding process. As a result, umbrella 440 can achieve better positional tolerances at the conclusion of the forming of fastener 420 and ribs 476, 478 can be more accurately positioned.

The voids 483, 485 represent areas where the material of seal 424 is not present. These voids, however, are not believed to adversely affect the ability of seal 424 to be thermally bonded to umbrella 440 due to the decreased surface area of contact between seal 424 and umbrella 440. Voids 485 do not affect the ability of ribs 476, 478 to seal against the doorframe. If desired, voids 483, 485 can be nonaligned with one another such that the support provided for umbrella 440 is staggered along the upper and lower surfaces 444, 446, thereby providing a different level of support to umbrella 440 during the overmolding process. Seal 424 is thermally bonded to umbrella 440.

Clip 422 is a relatively hard material while seal 424 is a relatively soft and resilient material. Clip 422 and seal 424 can be molded in a two-step or two-shot process. Clip 422, the hard part, can be injection molded first in a mold cavity. Clip 422 can be a thermo-plastic material, such as by way of non-limiting example, acetyl. Once clip 422 is injection molded, seal 424 can be injection molded (overmolded) around umbrella 440 of clip 422. The overmolding of seal 424 onto umbrella 440 can be done while clip 422 is still hot such that thermal bonding occurs between umbrella 440 and seal 424. The thermal bonding can inhibit the removal of seal 424 from umbrella 440. It is believed that the thermal bonding that occurs is adequate to meet removal force requirements for typical applications. The removal force can be enhanced through the use of the mechanical locking features discussed above. Thus, a fastener 420 according to the present teachings can include an injection molded clip 422 that is relatively hard having a relatively soft seal 424 overmolded over a portion of clip 422.

As shown in FIG. 48, the thickness $T_1$ of upper portion 481 of seal 424 can be generally the same as the thickness $T_2$ of connecting portion 480 of seal 424. The thickness $T_1$, $T_2$ is defined as the distance from the upper and lower surfaces 444, 446, respectively, of umbrella 440 to the exterior surface of upper portion 481 and connecting portion 480, respectively, of seal 424. By having thickness $T_1$ generally equal to thickness $T_2$, the molding of seal 424 onto umbrella 440 of clip 422 can be enhanced. That is, during the molding process, the seal material will flow through the mold cavity around umbrella 440 along upper and lower surfaces 444, 446. The flowing will occur in a circular manner in both clockwise and counterclockwise directions about umbrella 440. The mold material will meet on the side of umbrella 440 opposite to the location of injection. By having thickness $T_1$ generally equal to thickness $T_2$, the upper portion 481 and connecting portion 480 along with ribs 476, 478 will generally meet at the opposite side at the same time thereby allowing the injection process to cease. In the event that either the upper portion 481 or the portions of seal 424 along lower surface 446 would be completed first, the additional pressure may cause undesirable distortion in umbrella 440. Thus, the arranging of the thicknesses $T_1$, $T_2$ relative to one another can facilitate the molding of seal 424 onto umbrella 440.

In use, clip 422 is inserted into doghouse assembly 436 which can be integral with or attached to a door panel 426. Neck 434 extends through the opening in doghouse assembly 436 with head 430 and collar 432 disposed on opposite sides of doghouse assembly 436. With fastener 420 secured in doghouse assembly 436, the base portion of fastener 420 can be inserted into an opening 429 in a doorframe 428. During insertion of fastener 420 into doorframe 428, intermediate portions 462, 466 will engage with opening 429 and legs 452 will be elastically compressed radially inwardly. When shoulders 468 pass entirely through opening 429, legs 452 resiliently expand radially outwardly to retain fastener 420 in doorframe 428. Umbrella 440 can axially flex as ribs 476, 478 of seal 424 encounter the surface of doorframe 428.

The resilient nature of umbrella 440 and ribs 476, 478 enable ribs 476, 478 to exert a force on the surface of doorframe 428 and form inner and outer seals there along. Ribs 476, 478 may deform radially outwardly as fastener 420 is inserted into doorframe 428. The resilient nature of umbrella 440 and inner and outer ribs 476, 478 along with the differing lengths of ribs 476, 478 can accommodate varying thicknesses T of doorframes 428. That is, the use of resilient seal 424 along with umbrella 440 can allow fastener 420 to be inserted into doorframes 428 having varying thicknesses T while still providing a desired seal against the surface of doorframe 428 around opening 429. Thus, a fastener 420 according to the present teachings can be a single-piece fastener that can be used to seal around the opening of a doorframe and can accommodate varying thicknesses of the doorframe.

Referring now to FIGS. 50 and 51, another preferred fastener 420' is shown. Fastener 420' is substantially similar to fastener 420 discussed above with circular collar 432 and lower neck 438 removed therefrom. As such, umbrella 440' extends radially outwardly and axially downwardly from neck 434'. Umbrella 440' includes an annular shoulder 441' adjacent neck 434'. Annular shoulder 441' has a generally flat and planar upper surface 443' that engages with the doghouse assembly to limit the axial movement of fastener 420' relative to the doghouse assembly. Shoulder 441' thereby acts in a similar manner to the removed circular collar.

The fasteners according to the present teachings are shown and described with reference to specific examples. It should be appreciated, however, that the various features of the fasteners shown can be intermixed, altered, or eliminated from that shown and still be within the scope of the teachings and the claims. For example, the distance to which the inner and outer ribs of the seal extend axially downwardly can vary from that shown as necessitated by the application within which the fastener is to be employed. Additionally, the radial location of the inner and outer ribs can also vary depending upon the application within which the fastener is to be utilized. Additionally, a single rib or more than two ribs can be utilized. Moreover, the configuration of the clip can vary from that shown and the seal can be used on clips of differing designs. Furthermore, while the fasteners are shown as being configured for use in a doghouse assembly, other designs for the upper portion of the fastener can be employed to allow the fastener to be used to retain panels or trim pieces that contain other features to interact with a fastener. Moreover, it should be appreciated that the relative dimensions shown for the various components of the fasteners are provided by way of example and the actual relative dimensions can vary from that shown. It should be appreciated that a fastener of the present invention can be used for securing other automotive vehicle components, such as and not be limited to, garnish moldings, package shelves, sail trim panels, headliners, lamps, trunk trim and the like.

Moreover, it should be appreciated that the references made herein to the terms "upper," "lower," "upwardly," "downwardly," "above," "below," and similar type expressions are used herein merely to indicate relative positions and are not absolute references. In construing such terms, the head of the fastener can be equated to the top while the tip of the fastener can be equated to the bottom. Thus, such directional references are merely relative references and are not intended to be interpreted literally in that the fastener can be oriented and used in a variety of positions.

What is claimed is:

1. A method of manufacturing a fastener to retain an automotive vehicle trim panel to a structural body panel, the method comprising:
    (a) molding a clip of a first material, the clip including an umbrella;
    (b) supporting the umbrella in a mold cavity having at least one mold feature contacting at least one side of the umbrella; and
    (c) forming a sealing member in the mold cavity with a second material having a lower durometer rating than the first material and extending around portions of the opposite sides of the umbrella adjacent an edge of the umbrella and around the at least one mold feature thereby creating at least one void in the sealing member on at least one side of the umbrella upon removal of the at least one mold feature.

2. The method of claim 1, wherein the at least one mold feature includes multiple mold features, thereby creating multiple ones of the at least one void.

3. The method of claim 2, further comprising positioning multiple ones of the at least one mold feature to contact each of the opposite sides of the umbrella, thereby creating multiple opposing ones of the at least one void.

4. The method of claim 2, further including maintaining contact of the multiple mold features with each of an upper surface and a lower surface of the umbrella during the forming step to maintain the umbrella in a desired orientation.

5. The method of claim 1, wherein the process of forming the sealing member includes preventing the second material from contacting the umbrella where the at least one mold feature contacts the umbrella to create the at least one void such that the at least one void extends entirely through the sealing member partially exposing the umbrella.

6. The method of claim 1, wherein the molding step further includes molding a head portion, a tip portion, and a pair of legs extending from the tip portion, and positioning the umbrella between the head and tip portions.

7. A method of manufacturing a fastener to retain an automotive vehicle trim panel to a structural body panel, the method comprising:
   (a) molding a clip with a first polymeric material, including a head portion, a tip portion, and an umbrella between the head and tip portions;
   (b) supporting the umbrella in a mold cavity using mold features that engage opposite sides of the umbrella to hold the umbrella stationary;
   (c) forming a sealing member in the mold cavity with a second polymeric material different than the first polymeric material and extending around portions of the opposite sides of the umbrella adjacent an edge of the umbrella and around the mold features; and
   (d) creating a plurality of voids in the sealing member on the opposite sides of the umbrella when removing the mold features at locations where the features engaged the umbrella.

8. The method of claim 7, wherein the process of forming the sealing member includes forming at least one rib extending from the umbrella.

9. The method of claim 8, wherein the process of forming the at least one rib includes forming a pair ribs radially spaced apart and circumferentially extending from one of the opposite sides of the umbrella with selected ones of the voids positioned between the ribs.

10. The method of claim 7, further including selecting the first polymeric material having a first durometer rating and selecting the second polymeric material of a second durometer rating less than the first durometer rating.

11. The method of claim 7, wherein the supporting step includes equally spacing the mold features.

12. The method of claim 7, wherein the supporting step includes positioning the mold features on a first one of the opposite sides of the umbrella out of alignment with the mold features on a second one of the opposite sides.

13. The method of claim 7, further including maintaining contact of the mold features with each of an upper surface and a lower surface of the umbrella during the forming process to maintain the umbrella in a desired orientation.

14. The method of claim 7, further including forming first and second concentrically aligned and radially spaced apart ribs extending from one of the opposite sides of the umbrella with selected ones of the voids positioned between the ribs during the forming process.

15. The method of claim 7, further including aligning individual ones of the voids of a first one of the opposite sides with individual ones of the voids of a second one of the opposite sides.

16. The method of claim 7, further including thermally bonding the sealing member to the umbrella.

17. The method of claim 7, further including staggering an alignment of individual ones of the voids of a first one of the opposite sides with individual ones of the voids of a second one of the opposite sides with respect to upper and lower surfaces of the umbrella thereby varying a level of support to the umbrella during the forming process.

18. A method of manufacturing a fastener to retain an automotive vehicle trim panel to a structural body panel, the method comprising:
   (a) molding a clip with a polymeric material having a first durometer rating, the clip including a head portion, a tip portion, a pair of legs extending from the tip portion that are elastically deflectable toward each other, and an umbrella between the head and tip portions;
   (b) supporting the umbrella in a mold cavity using mold features that engage opposite first and second sides of the umbrella to hold the umbrella stationary;
   (c) forming a sealing member in the mold cavity with a polymeric material having a second durometer rating lower than the first durometer rating that extends around portions of the first and second sides of the umbrella adjacent an edge of the umbrella and encircling the mold features; and
   (d) creating a plurality of voids in the sealing member on the first and second sides of the umbrella by maintaining contact at individual areas where the mold features contact the umbrella during the forming step to prevent the polymeric material sealing member from contacting the umbrella at the individual areas.

19. The method of claim 18, further including aligning individual ones of the mold features on the first side with individual ones of the mold features on the second side such that the mold features inhibit deformation of the umbrella during the forming step.

20. The method of claim 18, further including positioning individual ones of the mold features on the first side out of alignment with respect to individual ones of the mold features on the second side thereby staggering the plurality of voids in the sealing member on the first side of the umbrella with respect to the plurality of voids in the sealing member on the second side of the umbrella.

* * * * *